US012614152B2

(12) United States Patent
Cook

(10) Patent No.: US 12,614,152 B2
(45) Date of Patent: Apr. 28, 2026

(54) USING MACHINE LEARNING TO DETERMINE JOB TITLES BASED ON INFORMATION PERTAINING TO ACCESSES OF DATA ITEMS

(71) Applicant: Sequoia Benefits and Insurance Services, LLC, San Mateo, CA (US)

(72) Inventor: David Brian Cook, Santa Cruz, CA (US)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 230 days.

(21) Appl. No.: 18/382,948

(22) Filed: Oct. 23, 2023

(65) Prior Publication Data

US 2025/0131380 A1     Apr. 24, 2025

(51) Int. Cl.
*G06Q 10/105* (2023.01)
*G06N 20/00* (2019.01)

(52) U.S. Cl.
CPC ........... *G06Q 10/105* (2013.01); *G06N 20/00* (2019.01)

(58) Field of Classification Search
CPC .. G06Q 10/105; G06Q 10/1053; G06N 20/00; H04L 41/16; H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 11,636,213 B1 | 4/2023 | Elgressy | |
| 2014/0090061 A1* | 3/2014 | Avasarala | G06F 21/566 |
| | | | 726/24 |
| 2017/0024701 A1* | 1/2017 | Tang | G06F 16/9535 |
| 2017/0372266 A1* | 12/2017 | Shacham | G06Q 10/1053 |
| 2018/0124073 A1 | 5/2018 | Scherman | |
| 2019/0182287 A1 | 6/2019 | Hanley et al. | |
| 2020/0265356 A1 | 8/2020 | Lee | |
| 2020/0280573 A1 | 9/2020 | Johnson et al. | |
| 2020/0286400 A1* | 9/2020 | Jackson | G16H 10/60 |
| 2021/0084104 A1* | 3/2021 | Glickman | G06F 21/6218 |
| 2021/0256435 A1* | 8/2021 | Palmer | G06Q 10/0633 |
| 2021/0273957 A1 | 9/2021 | Boyer et al. | |
| 2021/0383229 A1* | 12/2021 | Hanna | G06Q 10/1053 |
| 2022/0114186 A1* | 4/2022 | Frazier | G06F 21/602 |
| 2022/0358522 A1* | 11/2022 | Carmody | G06Q 10/10 |
| 2023/0344842 A1 | 10/2023 | Akhtar | |
| 2024/0031371 A1* | 1/2024 | Batni | H04L 63/102 |
| 2024/0430282 A1 | 12/2024 | Wang | |

(Continued)

*Primary Examiner* — Michael Won
(74) *Attorney, Agent, or Firm* — Lowenstein Sandler LLP

(57) ABSTRACT

A machine learning model is trained using information pertaining to accesses of data items at a software-as-a-service (SaaS) management platform. A first training input is generated. The first training input includes access data identifying multiple data items accessed at the SaaS management platform using a subset of user accounts of multiple user accounts associated with a client organization. A first target output is generated. The first target output identifies for each user account, information identifying a respective job title associated with the client organization. The training data is provided to train the machine learning model on (i) a set of training inputs including the first training input, and (ii) a set of target outputs including the first target output.

25 Claims, 16 Drawing Sheets

(56)        References Cited

U.S. PATENT DOCUMENTS

| | | | |
|---|---|---|---|
| 2025/0014040 A1* | 1/2025 | Smith | ................. G06Q 20/4016 |
| 2025/0030717 A1 | 1/2025 | Nyamwange | |
| 2025/0063101 A1 | 2/2025 | Cegielski-Johnson | |
| 2025/0131380 A1* | 4/2025 | Cook | ................... G06Q 10/105 |
| 2025/0133090 A1 | 4/2025 | Cook | |
| 2025/0133091 A1 | 4/2025 | Cook | |

* cited by examiner

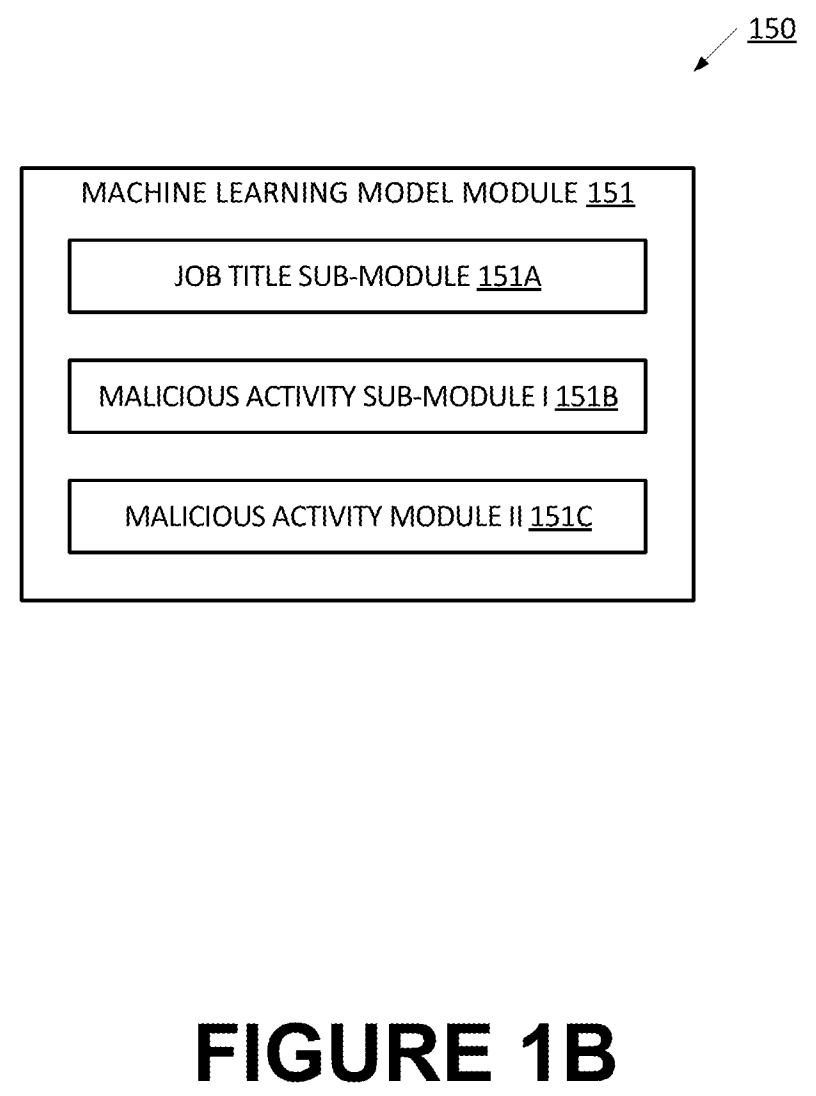

150

MACHINE LEARNING MODEL MODULE 151

JOB TITLE SUB-MODULE 151A

MALICIOUS ACTIVITY SUB-MODULE I 151B

MALICIOUS ACTIVITY MODULE II 151C

FIGURE 1B

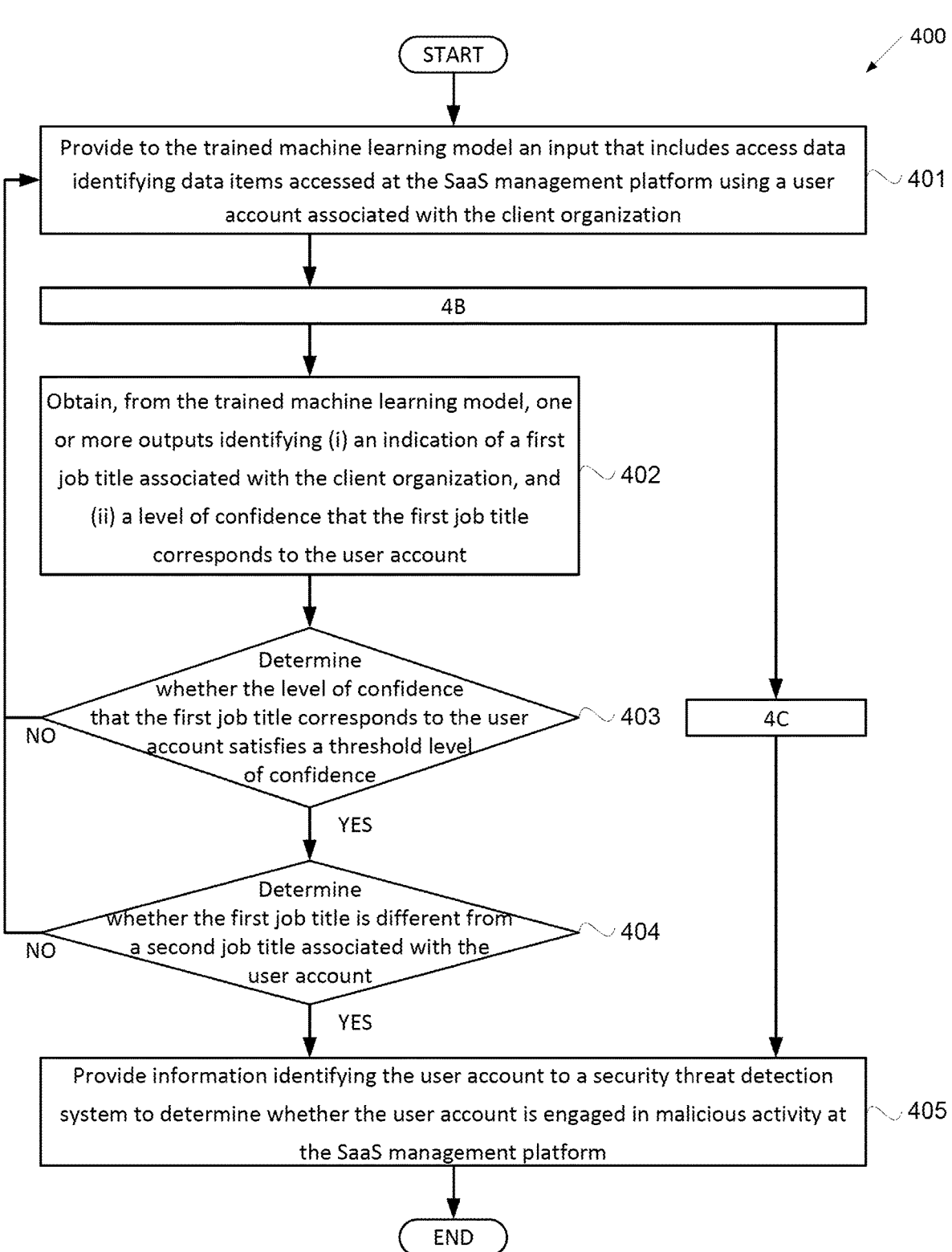

400

START

Provide to the trained machine learning model an input that includes access data identifying data items accessed at the SaaS management platform using a user account associated with the client organization ~401

4B

Obtain, from the trained machine learning model, one or more outputs identifying (i) an indication of a first job title associated with the client organization, and (ii) a level of confidence that the first job title corresponds to the user account ~402

Determine whether the level of confidence that the first job title corresponds to the user account satisfies a threshold level of confidence ~403

4C

NO

YES

Determine whether the first job title is different from a second job title associated with the user account ~404

NO

YES

Provide information identifying the user account to a security threat detection system to determine whether the user account is engaged in malicious activity at the SaaS management platform ~405

END

FIGURE 4A

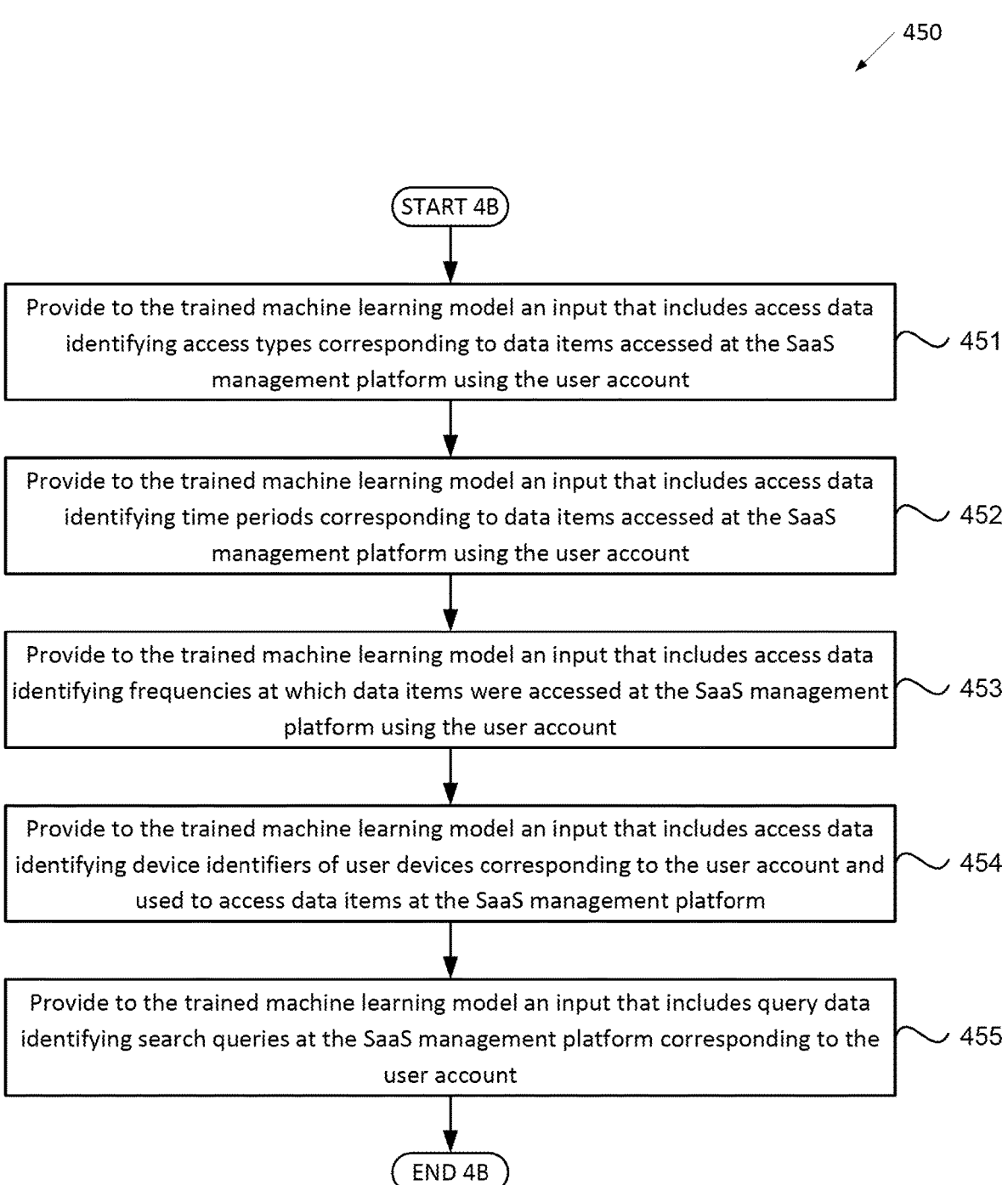

450

START 4B

Provide to the trained machine learning model an input that includes access data identifying access types corresponding to data items accessed at the SaaS management platform using the user account ~ 451

Provide to the trained machine learning model an input that includes access data identifying time periods corresponding to data items accessed at the SaaS management platform using the user account ~ 452

Provide to the trained machine learning model an input that includes access data identifying frequencies at which data items were accessed at the SaaS management platform using the user account ~ 453

Provide to the trained machine learning model an input that includes access data identifying device identifiers of user devices corresponding to the user account and used to access data items at the SaaS management platform ~ 454

Provide to the trained machine learning model an input that includes query data identifying search queries at the SaaS management platform corresponding to the user account ~ 455

END 4B

FIGURE 4B

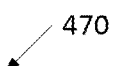

470

401

(START 4C)

Obtain, from the trained machine learning model, one or more
outputs identifying (i) an indication of a first job department
associated with the client organization, and (ii) a level of confidence
that the first job department corresponds to the user account

471

Determine
whether the level of confidence
that the first job department corresponds to the user
account exceeds a threshold level
of confidence

472

NO

YES

Determine
whether the first job department is different from
a second job department associated with the
user account

473

NO

YES (END 4C)

FIGURE 4C

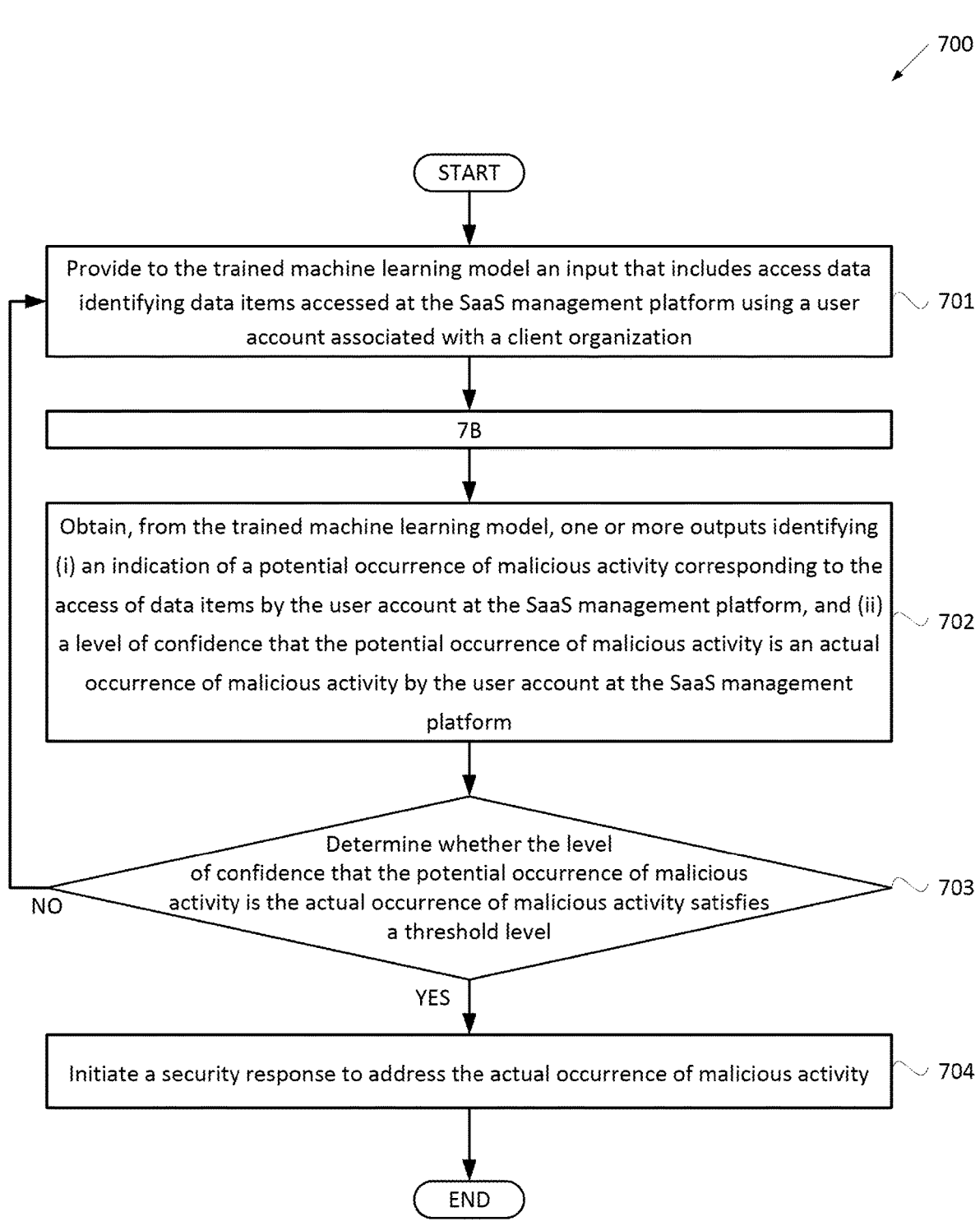

700

START

Provide to the trained machine learning model an input that includes access data identifying data items accessed at the SaaS management platform using a user account associated with a client organization — 701

7B

Obtain, from the trained machine learning model, one or more outputs identifying (i) an indication of a potential occurrence of malicious activity corresponding to the access of data items by the user account at the SaaS management platform, and (ii) a level of confidence that the potential occurrence of malicious activity is an actual occurrence of malicious activity by the user account at the SaaS management platform — 702

Determine whether the level of confidence that the potential occurrence of malicious activity is the actual occurrence of malicious activity satisfies a threshold level — 703

NO

YES

Initiate a security response to address the actual occurrence of malicious activity — 704

END

FIGURE 7A

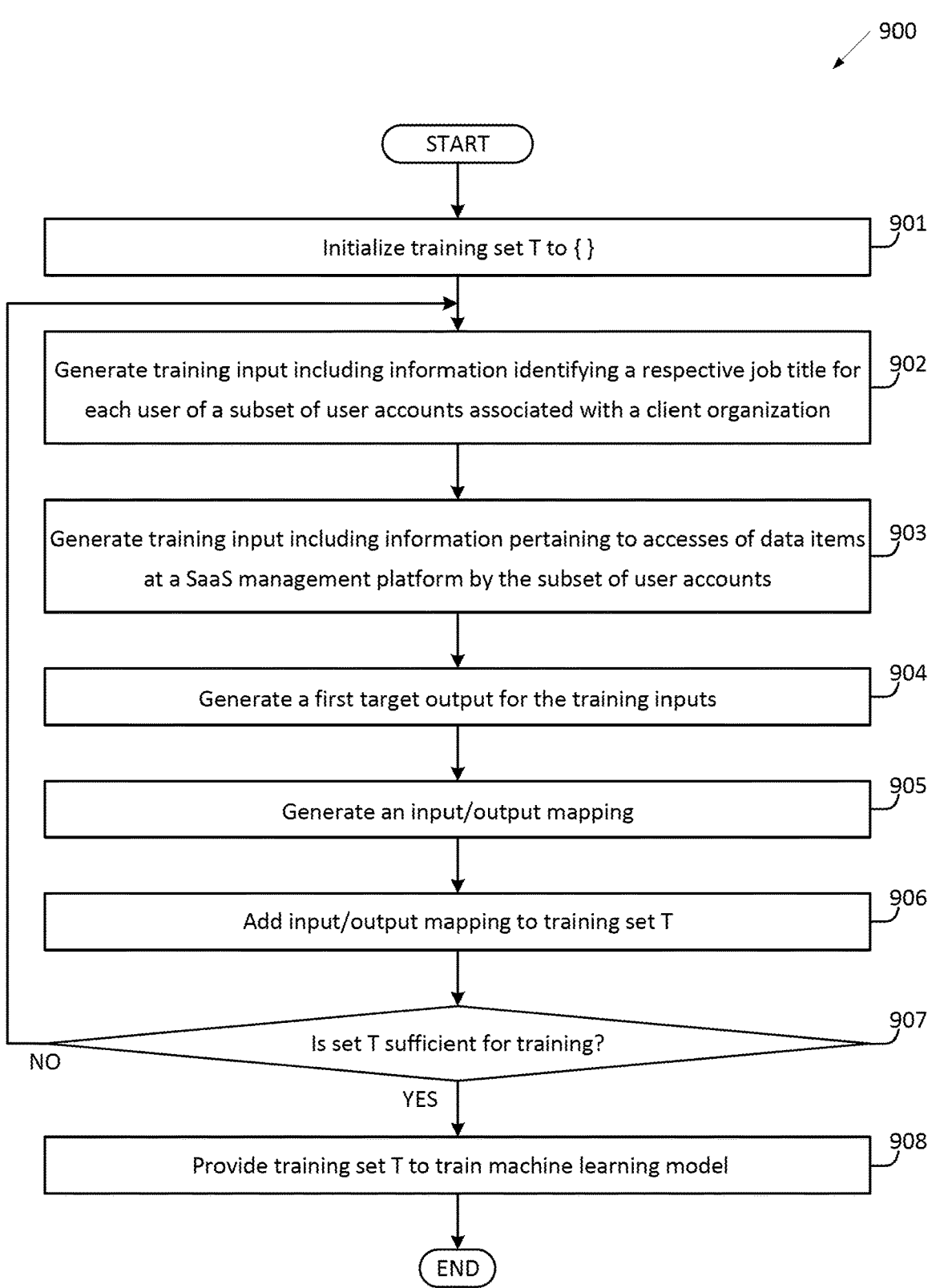

900

START

Initialize training set T to { } — 901

Generate training input including information identifying a respective job title for each user of a subset of user accounts associated with a client organization — 902

Generate training input including information pertaining to accesses of data items at a SaaS management platform by the subset of user accounts — 903

Generate a first target output for the training inputs — 904

Generate an input/output mapping — 905

Add input/output mapping to training set T — 906

Is set T sufficient for training? — 907

NO

YES

Provide training set T to train machine learning model — 908

END

USING MACHINE LEARNING TO DETERMINE JOB TITLES BASED ON INFORMATION PERTAINING TO ACCESSES OF DATA ITEMS

TECHNICAL FIELD

Aspects and embodiments of the disclosure relate to data processing, and more specifically, to using a machine learning model to determine job titles using information pertaining to accesses of data items.

BACKGROUND

Many organizations use job titles to define the responsibilities, duties, and level of authority associated with a particular job or role. Job titles can help provide clarity in the workplace, both internally among employees and externally for clients, customers, and job seekers.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method for training a machine learning model using information pertaining to accesses of data items at a software-as-a-service (SaaS) management platform, the method including: generating training data for the machine learning model, wherein generating the training data comprises: generating a first training input, the first training input comprising first access data identifying a first plurality of data items accessed at the SaaS management platform using a first subset of a plurality of user accounts associated with a client organization; generating a first target output for the first training input, wherein the first target output identifies, for each of the first subset of user accounts, information identifying a respective job title of a plurality of job titles associated with the client organization; and providing the training data to train the machine learning model on (i) a set of training inputs comprising the first training input, and (ii) a set of target outputs comprising the first target output.

In some embodiments, the method includes: wherein the first training input comprises the first access data identifying the first plurality of data items accessed at a first SaaS service of the SaaS management platform, wherein generating the training data for the machine learning model, further comprises: generating a second training input, the second training input comprising second access data identifying a second plurality of data items accessed at a second SaaS service of the SaaS management platform using a second subset of the plurality of user accounts, and wherein the first target output identifies, for each of the second subset of user accounts, information identifying the respective job title of the plurality of job titles associated with the client organization, and wherein the set of training inputs comprises the second training input.

In some embodiments, the method includes: wherein generating the training data for the machine learning model, further comprises: generating a third training input, the third training input comprising third access data identifying access types corresponding to the first plurality of data items accessed at the SaaS management platform using the first subset of user accounts, wherein the set of training inputs comprises the third training input.

In some embodiments, the method includes: wherein generating the training data for the machine learning model, further comprises: generating a fourth training input, the fourth training input comprising fourth access data identifying time periods the first plurality of data items were accessed at the SaaS management platform using the first subset of user accounts, wherein the set of training inputs comprises the fourth training input.

In some embodiments, the method includes: wherein generating the training data for the machine learning model, further comprises: generating a fifth training input, the fifth training input comprising fifth access data identifying frequencies at which the first plurality of data items were accessed at the SaaS management platform using the first subset of user accounts, wherein the set of training inputs comprises the fifth training input.

In some embodiments, the method includes: wherein generating the training data for the machine learning model, further comprises: generating a sixth training input, the sixth training input comprising sixth access data identifying device identifiers of a plurality of user devices corresponding with the first subset of user accounts and used to access the first plurality of data items at the SaaS management platform, wherein the set of training inputs comprises the sixth training input.

In some embodiments, the method includes: wherein generating the training data for the machine learning model, further comprises: generating a seventh training input, the seventh training input comprising query data identifying search queries at the SaaS management platform and corresponding with the first subset of user accounts, wherein the set of training inputs comprises the seventh training input.

In some embodiments, the method includes: wherein generating the training data for the machine learning model, further comprises: generating a second target output for the first training input, wherein the second target output identifies, for each of the first subset of user accounts, information identifying a respective department of a plurality of departments associated with the client organization, wherein the set of training outputs comprises the second training output.

In some embodiments, the method includes: wherein each training input of the set of training inputs is mapped to the first target output in the set of target outputs.

An aspect of the disclosure provides a computer-implemented method for using a trained machine learning model using information pertaining to accesses of data items at a software-as-a-Service (SaaS) management platform to determine a job title of plurality of job titles associated with a client organization, the method comprising: providing to the trained machine learning model a first input, the first input comprising first access data identifying a first plurality of data items accessed at the SaaS management platform using a first user account of a plurality of user accounts associated with the client organization; and obtaining, from the trained machine learning model, one or more outputs identifying (i) an indication of the job title of the plurality of job titles associated with the client organization, and (ii) a level of confidence that the job title corresponds to the accesses of the data items at the SaaS management platform.

In some embodiments, the method includes: wherein the job title is a first job title, the method further comprising:

determining whether the first job title obtained from the trained machine learning model is different than a second job title associated with the first user account; and responsive to determining that the first job title is different than the second job title, providing information identifying the first user account to a security threat detection system to determine whether the first user account is engaged in malicious activity at the SaaS management platform.

In some embodiments, the method includes: further comprising: determining whether the level of confidence that the job title corresponds to the information pertaining to the accesses of the data items at the SaaS management platform satisfies a threshold level of confidence, wherein providing the information identifying the first user account to the security threat detection system is responsive to determining that the level of confidence satisfies the threshold level of confidence.

In some embodiments, the method includes: further comprising: providing to the trained machine learning model a second input comprising second access data identifying a second plurality of data items accessed at a second SaaS service of the SaaS management platform using the first user account.

In some embodiments, the method includes: further comprising: providing to the trained machine learning model a third input comprising third access data identifying access types corresponding to the first plurality of data items accessed at the SaaS management platform using the first user account.

In some embodiments, the method includes: further comprising: providing to the trained machine learning model a fourth input comprising fourth access data identifying time periods the first plurality of data items were accessed at the SaaS management platform using the first user account.

In some embodiments, the method includes: further comprising: providing to the trained machine learning model a fifth input comprising fifth access data identifying frequencies at which the first plurality of data items were accessed at the SaaS management platform using the first user account.

In some embodiments, the method includes: further comprising: providing to the trained machine learning model a sixth input comprising sixth access data identifying device identifiers of a user device corresponding with the first user account and used to access the first plurality of data items at the SaaS management platform.

In some embodiments, the method includes: further comprising: providing to the trained machine learning model a seventh input comprising query data identifying search queries at the SaaS management platform and corresponding with the first user account.

An aspect of the disclosure provides a computer-implemented method for training a machine learning model using information pertaining to accesses of data items at a software-as-a-service (SaaS) management platform, the method comprising: generating training data for the machine learning model, wherein generating the training data comprises: generating a first training input, the first training input comprising first access data identifying a first plurality of data items accessed at the SaaS management platform using a first subset of a plurality of user accounts associated with a client organization; and generating a first target output for the first training input, wherein the first target output indicates, for each of the first subset of user accounts, whether an occurrence of malicious activity is detected at the SaaS management platform; and providing the training data to train the machine learning model on (i) a set of training inputs comprising the first training input, and (ii) a set of target outputs comprising the first target output.

In some embodiments, the method includes: wherein the first training input comprises the first access data identifying the first plurality of data items accessed at a first SaaS service of the SaaS management platform, wherein generating the training data for the machine learning model, further comprises: generating a second training input, the second training input comprising second access data identifying a second plurality of data items accessed at a second SaaS service of the SaaS management platform using a second subset of the plurality of user accounts, and wherein the first target output indicates, for each of the second subset of user accounts, whether the occurrence of malicious activity is detected at the SaaS management platform, and wherein the set of training inputs comprises the second training input.

In some embodiments, the method includes: wherein generating the training data for the machine learning model, further comprises: generating a third training input, the third training input comprising third access data identifying access types corresponding to the first plurality of data items accessed at the SaaS management platform using the first subset of user accounts, wherein the set of training inputs comprises the third training input.

In some embodiments, the method includes: wherein generating the training data for the machine learning model, further comprises: generating a fourth training input, the fourth training input comprising fourth access data identifying time periods the first plurality of data items were accessed at the SaaS management platform using the first subset of user accounts, wherein the set of training inputs comprises the fourth training input.

In some embodiments, the method includes: wherein generating the training data for the machine learning model, further comprises: generating a fifth training input, the fifth training input comprising fifth access data identifying, for each of the first subset of user accounts, calendar events corresponding to non-work periods, wherein the set of training inputs comprises the fifth training input.

In some embodiments, the method includes: wherein generating the training data for the machine learning model, further comprises: generating a sixth training input, the sixth training input comprising sixth access data identifying frequencies at which the first plurality of data items were accessed at the SaaS management platform using the first subset of user accounts, wherein the set of training inputs comprises the sixth training input.

In some embodiments, the method includes: wherein generating the training data for the machine learning model, further comprises: generating seventh training input, the seventh training input comprising information identifying a respective job title of a plurality of job titles for each of the first subset of user accounts, wherein the set of training inputs comprises the seventh training input.

In some embodiments, the method includes: wherein generating the training data for the machine learning model, further comprises: generating eighth training input, the eighth training input comprising information identifying, for each of the first subset of user accounts, a respective department of a plurality of departments of the client organization.

In some embodiments, the method includes: wherein each training input of the set of training inputs is mapped to the first target output in the set of target outputs.

An aspect of the disclosure provides a computer-implemented method for using a trained machine learning model using information pertaining to accesses of data items at a software-as-a-Service (SaaS) management platform to determine an occurrence of malicious activity at the SaaS management platform, the method comprising: providing to the trained machine learning model a first input, the first input comprising first access data identifying a first plurality of data items accessed at the SaaS management platform using a first user account of a plurality of user accounts associated with a client organization; and obtaining, from the trained machine learning model, one or more outputs identifying (i) an indication of a potential occurrence of malicious activity corresponding to the access of data items by the first user account at the SaaS management platform, and (ii) a level of confidence that the potential occurrence of malicious activity is an actual occurrence of malicious activity by the first user account at the SaaS management platform.

In some embodiments, the method includes: further comprising: determining whether the level of confidence that the potential occurrence of malicious activity is the actual occurrence of malicious activity by the first user account at the SaaS management platform satisfies a threshold level.

In some embodiments, the method includes: further comprising: responsive to determining that the level of confidence satisfies the threshold level, initiating a security response to address the actual occurrence of malicious activity.

In some embodiments, the method includes: wherein initiating the security response to address the actual occurrence of malicious activity comprises: providing a notification identifying the actual occurrence of malicious activity, an identifier of the first user account, and information identifying the first access data.

In some embodiments, the method includes: initiating the security response to address the actual occurrence of malicious activity comprises: initiating, at the SaaS management platform, an account lock out corresponding to the first user account.

In some embodiments, the method includes: wherein the first input comprises the first access data identifying the first plurality of data items accessed at a first SaaS service of the SaaS management platform using the first user account, the method further comprising: providing to the trained machine learning model a second input, the second input comprising second access data identifying a second plurality of data items accessed at a second SaaS service of the SaaS management platform using the first user account.

In some embodiments, the method includes: further comprising: providing to the trained machine learning model a third input comprising third access data identifying access types corresponding to the first plurality of data items accessed at the SaaS management platform using the first user account.

In some embodiments, the method includes: further comprising: providing to the trained machine learning model a fourth input comprising fourth access data identifying time periods the first plurality of data items were accessed at the SaaS management platform using the first user account.

In some embodiments, the method includes: further comprising: providing to the trained machine learning model a fifth input comprising fifth access data identifying, for the first user account, calendar events corresponding to non-work periods.

In some embodiments, the method includes: further comprising: providing to the trained machine learning model a sixth input comprising sixth access data identifying frequencies at which the first plurality of data items were accessed at the SaaS management platform using the first user account.

In some embodiments, the method includes: further comprising: providing to the trained machine learning model a seventh input comprising information identifying a respective job title of a plurality of job titles for the first user account.

In some embodiments, the method includes: further comprising: providing to the trained machine learning model an eighth input comprising information identifying, for the first user account, a respective department of a plurality of departments of the client organization.

An aspect of the disclosure provides a computer-implemented method for training a machine learning model using information pertaining to a job title and accesses of data items at a software-as-a-service (SaaS) management platform, the method comprising: generating training data for the machine learning model, wherein generating the training data comprises: generating first training input, the first training input comprising information identifying a respective job title of a plurality of job titles for each user of a first subset of a plurality of user accounts associated with a client organization; generating second training input, the second training input comprising first information pertaining to the accesses of data items at the SaaS management platform by the first subset of user accounts; and generating a first target output for the first training input and the second training input, wherein the first target output indicates, for each of the first subset of user accounts, whether an occurrence of malicious activity is detected at the SaaS management platform; and providing the training data to train the machine learning model on (i) a set of training inputs comprising the first training input and the second training input, and (ii) a set of target outputs comprising the first target output.

In some embodiments, the method includes: wherein the first training input comprising the first information identifying the respective job title of the plurality of job titles for each of the first subset of user accounts associated with the client organization is generated using a trained machine learning model.

In some embodiments, the method includes: wherein generating the first training input, comprises: for each of the first subset of user account: providing to the trained machine learning model a first input, the first input comprising second information pertaining to accesses of data items at the SaaS management platform by the first subset of user accounts; and obtaining, from the trained machine learning model, one or more outputs identifying (i) an indication of the job title of the plurality of job titles associated with the client organization, and (ii) a level of confidence that the job title corresponds to the accesses of the data items at the SaaS management platform.

In some embodiments, the method includes: wherein the first information pertaining to the accesses of data items at the SaaS management platform by the first subset of user accounts comprises first access data identifying a first plurality of data items accessed at the SaaS management platform using the first subset of user accounts.

In some embodiments, the method includes: wherein the first information pertaining to the accesses of data items at the SaaS management platform by the first subset of user accounts comprises second access data identifying access types corresponding to the first plurality of data items accessed at the SaaS management platform using the first subset of user accounts.

In some embodiments, the method includes: wherein the first information pertaining to the accesses of data items at the SaaS management platform by the first subset of user accounts comprises third access data identifying time periods the first plurality of data items were accessed at the SaaS management platform using the first subset of user accounts.

In some embodiments, the method includes: wherein the first information pertaining to the accesses of data items at the SaaS management platform by the first subset of user accounts comprises fourth access data identifying, for each of the first subset of user accounts, calendar events corresponding to non-work periods.

In some embodiments, the method includes: wherein the second training input comprises the first information pertaining to the accesses of data items at a first SaaS service of the SaaS management platform by the first subset of user accounts, wherein generating the training data for the machine learning model, further comprises: generating a third training input, the third training input comprising third information pertaining to accesses of data items at a second SaaS service of the SaaS management platform by a second subset of the plurality of user accounts, wherein the first target output indicates, for each of the second subset of user accounts, whether the occurrence of malicious activity is detected at the SaaS management platform, and wherein the set of training inputs comprises the third training input.

An aspect of the disclosure provides a computer-implemented method for using a trained machine learning model using information pertaining to a job title and accesses of data items at a software-as-a-service (SaaS) management platform to determine an occurrence of malicious activity at the SaaS management platform, the method comprising: providing to the trained machine learning model a first input, the first input comprising first information identifying a job title of a plurality of job titles for a first user account of a plurality of user accounts associated with a client organization; providing to the trained machine learning model a second input, the second input comprising first information pertaining to accesses of data items at the SaaS management platform by the first user account; and obtaining, from the trained machine learning model, one or more outputs identifying (i) an indication of a potential occurrence of malicious activity corresponding to the access of data items by the first user account at the SaaS management platform, and (ii) a level of confidence that the potential occurrence of malicious activity is an actual occurrence of malicious activity by the first user account at the SaaS management platform.

In some embodiments, the method includes: wherein the trained machine learning model is a first trained machine learning model, wherein the first input comprising the first information identifying the job title for the first user account is generated using a second trained machine learning model.

In some embodiments, the method includes: further comprising: providing to the second trained machine learning model a third input, the third input comprising second information pertaining to accesses of data items at the SaaS management platform by the first user account; and obtaining, from the second trained machine learning model, one or more outputs identifying (i) an indication of the job title of the plurality of job titles associated with the client organization, and (ii) a level of confidence that the job title corresponds to the second information pertaining to the accesses of the data items at the SaaS management platform by the first user account.

In some embodiments, the method includes: further comprising: determining whether the level of confidence satisfies a threshold level of confidence indicting that the job title corresponds to the second information pertaining to the accesses of the data items at the SaaS management platform by the first user account; and responsive to determining that the level of confidence satisfies a threshold level of confidence, associating the job title identified by the second trained machine learning model with the first user account.

In some embodiments, the method includes: further comprising: determining whether the level of confidence that the potential occurrence of malicious activity is the actual occurrence of malicious activity by the first user account at the SaaS management platform satisfies a threshold level; and initiating a security response to address the actual occurrence of malicious activity.

In some embodiments, the method includes: wherein initiating the security response to address the actual occurrence of malicious activity comprises: providing a notification identifying the actual occurrence of malicious activity, an identifier of the first user account, and information identifying the first information.

In some embodiments, the method includes: wherein initiating the security response to address the actual occurrence of malicious activity comprises: initiating, at the SaaS management platform, an account lock out corresponding to the first user account.

In some embodiments, the method includes: wherein the second input comprises the first information pertaining to accesses of data items at a first SaaS service of the SaaS management platform by the first user account, the method further comprising: providing to the trained machine learning model a third input, the third input comprising second information pertaining to accesses of data items at a second SaaS service of the SaaS management platform by the first user account.

In some embodiments, the method includes: wherein the first information pertaining to the accesses of data items at the SaaS management platform by the first user account comprises first access data identifying a first plurality of data items accessed at the SaaS management platform using the first user account.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 1B illustrates an example of a machine learning model module, in accordance with aspects of the disclosure.

FIG. 4A depicts a flow diagram of one example method for using a trained machine learning model to predict job titles, using information pertaining to accesses of data items of a SaaS management platform, in accordance with aspects of the disclosure.

FIG. 4B depicts a flow diagram of one example sub-method that can be used as a portion of a method for using a trained machine learning model to predict job titles, using information pertaining to accesses of data items of a SaaS management platform, in accordance with aspects of the disclosure.

FIG. 4C depicts a flow diagram of one example sub-method that can be used as a portion of a method for using a trained machine learning model to predict job titles, using information pertaining to accesses of data items of a SaaS management platform, in accordance with aspects of the disclosure.

FIG. 7A depicts a flow diagram of one example method for using a trained machine learning model to predict the occurrence of malicious activity, using information pertaining to accesses of data items of a SaaS management platform, in accordance with aspects of the disclosure.

FIG. 9 depicts a flow diagram of one example method for training a machine learning model, in accordance with aspects of the disclosure.

DETAILED DESCRIPTION

Figure 1A:
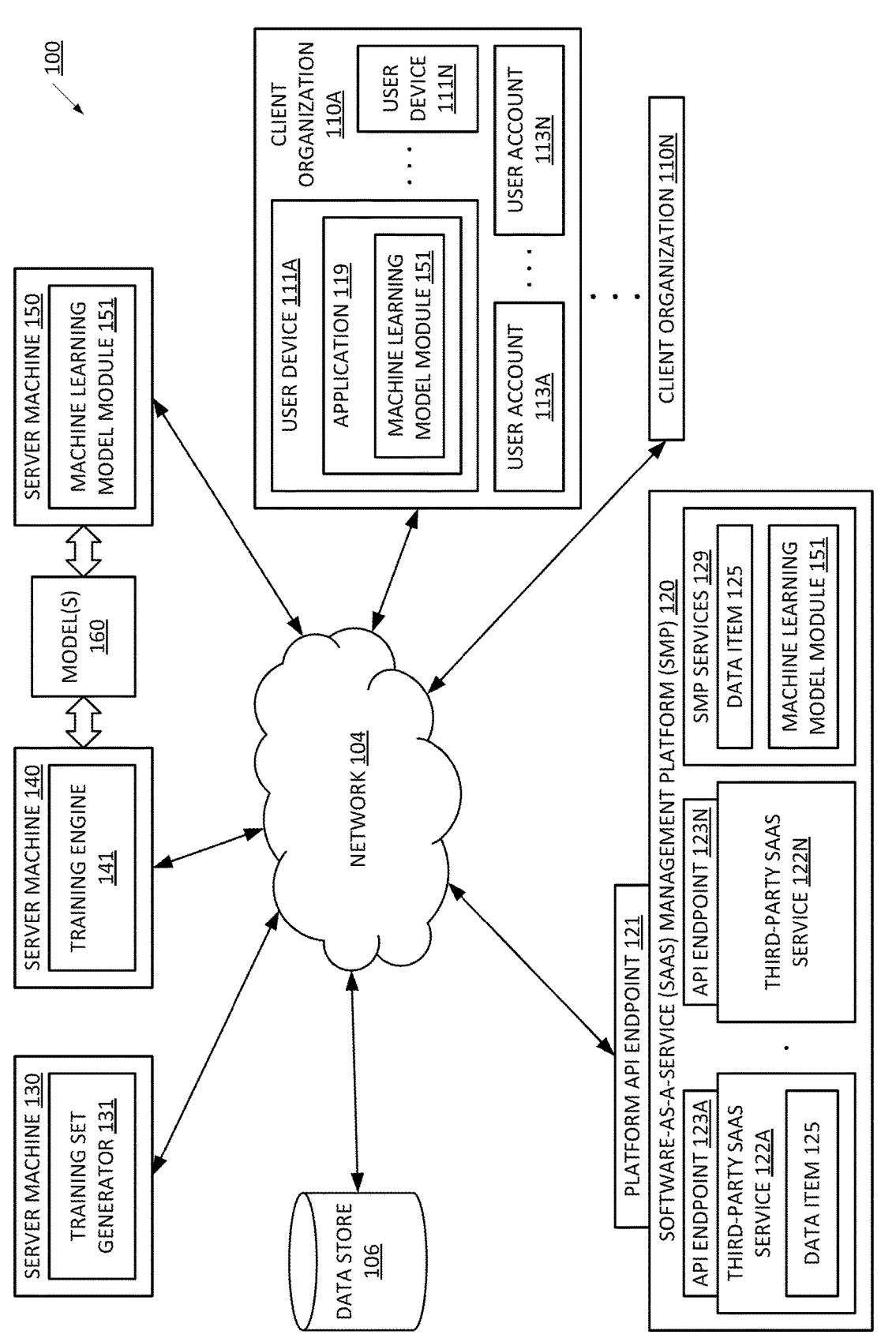
FIG. 1A illustrates an example system architecture, in accordance with aspects of the disclosure.

Organizations can use various services such as software-as-a-service (SaaS) services offered by different SaaS providers to assist organization personnel in performing respective responsibilities of the organization. In some cases, each SaaS service provider can have provider-specific security provisions to detect, deter, or mitigate malicious activity with respect to the SaaS service. In many cases, SaaS service providers and/or respective SaaS services of the SaaS service providers may not communicate (or be configured to communicated) with one another—and in particular may not communicate information relevant to detecting malicious activity. As such, the lack of communication can provide a security "void" that presents a potential area of exploitation by a malicious actor.

Another area of potential exploitation by a malicious actor can relate to job titles of an organization (also referred to as "client organization" herein). A job title can refer to a name of an organization-specific personnel position (e.g., organization-specific job) that is associated with a particular organization. For example, organization A can have an organization-specific personnel position with the job title, "Director of engineering." A job role can refer to a set of responsibilities, tasks, and/or duties assigned to an individual within an organization. In few cases, job title accurately reflects an individual's job role. In most cases, a job title does not accurately reflect an individual's job role. For example, an individual's job responsibilities and access to information can change over time, which may not be accurately reflected in an original job title. Since job title often does not accurately reflect an individual's job role, controlling access to information based on job title and detecting malicious activity based on such accesses can be challenging. A malicious actor that has access to a user account (associated with a job title) can often access organization information (e.g., sensitive data) that is outside of, and often far beyond, the scope of responsibilities associated the user account (and associated job title).

Additionally, tracking changes in a job role for a particular job title can be challenging. For example, collecting and analyzing the appropriate data to determine a job role, much less changes to a job role is non-trivial. In most cases, data that explicitly defines a job role or changes to a job role (corresponding to a job title) is not available. Thus, determining what data can accurately represent a job role is an initial challenge. Additionally, data that accurately represents job role may be located at different sources (e.g., different SaaS services used by the organization, also referred to as "third-party SaaS services" herein) and may be difficult to collect and analyze in the aggregate.

Aspects of the present disclosure address the above-mentioned and other challenges by using information pertaining to accesses of data items at a SaaS management platform by a user account (also referred to as "access information" herein). The SaaS management platform can manage multiple services (e.g., SaaS services) for access by user accounts of one or more organizations. Access information corresponding to a user account can be used as a "proxy" for determining the actual job role performed by a user of the user account, where the user account corresponds to a job title. In some embodiments, access information can include access data, query data, and/or organizational data. In some embodiments, access data can include information such as identifiers of data items that were accessed by a user account of an organization, data item access types (e.g., a read access, write access, copy access, a download access, or a share access), an access time period, an access frequency, a device identifier of a device corresponding to the user account. In some embodiments, query data can include information pertaining to searches performed by the user account. In some embodiments, organizational data can include information pertaining to a user associated with the user account (e.g., an assigned job title or department of the organization corresponding to the user).

In some embodiments, the SaaS management platform can train a machine learning model using access information corresponding to a subset of user accounts (e.g., user accounts associated with the job title, "Engineer Level 1") as training input to the machine learning model. The job title (e.g., "Engineer Level 1") can be used as a training output. In so doing, the job title can be accurately aligned with the access information related to accesses of data items by the subset of user accounts associated with the particular job title-which aligns job title to the actual job role in an organization based on access information.

In some embodiments, services managed by the SaaS management platform can include first-party SaaS services (e.g., services offered directly by the SaaS management platform), third-party SaaS services (e.g., services that are offered by third-party SaaS service providers), and/or a combination thereof. A third-party can refer to an entity, such as an enterprise or organization (e.g., third-party SaaS service provider) that is distinct and/or external from a first-party entity, such as the SaaS management platform. In some embodiments, the third-party SaaS service(s) can be offered to the organization in a manner that is opaque to the users of an organization, such that access to any SaaS services (first-party or third-party) appears to the users as an access of the SaaS management platform. In some embodiments, the SaaS management platform can obtain information identifying the access information from the various third-party SaaS services using application programming interface (API) calls of the third-party SaaS services providers (e.g., obtaining access logs from the providers). In some embodiments, the access information from the various first-party and third-party SaaS services offered by the SaaS management platform can be used as training input to train the machine learning model and input to the trained machine learning model.

In some embodiments, the trained machine learning model can be used to classify access information associated with a particular user account (e.g., user) as an actual job title (e.g., the same or different than the job title that is assigned to the user by the organization). In some embodiments, the trained machine learning model can be used to classify access information associated with a particular user account with an actual department (e.g., the same or different than the department that is assigned to the user by the organization). In some embodiments, the job title (or in some embodiments, the department) obtained from the trained machine learning model can be used a "baseline" for future comparisons, in accordance with some embodiments.

For example, and in some embodiments, the trained machine learning model can be used to determine whether changes in data access activity associated with a user account associated with an original job title (e.g., a job title assigned to the user by the organization or determined using a trained machine learning model) deviate from the job role corresponding to the original job title. The new or more recent access information associated with a user account can be used as input to the trained machine learning model. The output of the trained machine learning model can include a prediction of the job title associated with user account and a level of confidence that the predicted job title reflects the new or more recent access information associated with the user account. In some embodiments, if the predicted job title aligns with the original job title (e.g., the job title assigned to the user by the organization), the SaaS management platform can determine that malicious activity is unlikely. If the predicted job title does not align with the original job title, the SaaS management platform can take further action to determine whether malicious activity associated with the user account has occurred, and/or take remedial action to prevent further malicious activity.

As noted, a technical problem addressed by embodiments of the disclosure is the lack of communication between SaaS services (e.g., first-party and third-party SaaS services) used by an organization can provide a security "void" that presents a potential area of exploitation by a malicious actor.

Also noted, a technical problem addressed by embodiments of the disclosure is a job title accurately reflecting an individual's job role in an organization. For example, a person with the job title of "Engineer" can perform the job role of an engineer and the job role of a manager for a team of engineers despite the job title of "Engineer" not representing the job role of a manager.

Also noted, another technical problem is the difficulty of maintaining an up-to-date understanding of a job role for an individual of an organization. For example, job roles of an individual can change over time to meet current needs of an organization, despite the job title of the individual remaining constant.

A technical solution to the above identified technical problems can include training a machine learning using information pertaining to accesses of data items by a subset of user accounts. Training inputs can include access information and training outputs can include job title and/or department. The data identifying the access information can be acquired from first-party services and from third-party services using APIs provided by the third-party services. The trained machine learning model can be used to predict a job title and/or department based on access information (e.g., new, or recent access information). The predicted job title can more accurately reflect the actual job role.

Thus, the technical effect can include improving the ability of an organization to manage potential malicious activity across multiple software services (e.g., third-party SaaS services). For example, if the originally assigned job title is not the same or similar to the predicted job title, such may be an indication that the access behavior associated with the corresponding user account is unusual or malicious. Further, the technical effect can improve an organization's ability to accurately assign job titles that are reflective of actual job roles performed by organization personnel. Further, the technical effect can identify changes in job roles for a particular job title.

Malicious activity can refer to a deliberate, harmful, and/or unauthorized action performed with the intent to compromise the confidentiality, integrity, or availability of a computer system, network, data, or other digital resources of an entity (e.g., a client organization). Examples of malicious activity can include a compromised user account by a malicious actor, implementations of malicious software (e.g., "malware"), social engineering ("phishing"), server overloading (e.g., distributed denial of service (DDOS) attacks), and/or theft of trade secrets or other confidential information of an organization (often using a compromised user account of the organization).

In an illustrative example, a malicious activity can begin with an email phishing scheme that can allow the malicious actor to obtain login credentials of a user account of the organization. The malicious actor can use the login credentials of the user account to maliciously access organizational data. In another example, a malicious actor may include an internal party that uses their assigned user account to maliciously access organizational data, often organizational data that is outside the scope of the user's corresponding job title.

In some cases, malicious activity perpetrated using an authenticated user account can occur a paced cadence (e.g., a couple hours each week of malicious data accesses), which can make the malicious activity appear very similar to ordinary access behavior of the user account. Malicious activities though an authenticated user account, as described above, can be challenging to detect.

Aspects of the present disclosure address the above-mentioned and other challenges by using information pertaining to accesses of data items at a SaaS management platform by a user account to determine whether malicious activity for a particular user account has occurred. Access information corresponding to a user account can be used a "proxy" for determining whether the user account is engaged in a malicious activity. In some embodiments, the SaaS management platform can train a machine learning model using access information corresponding to a subset of user accounts as training input to train the machine learning model. In some embodiments, the access information pertaining to one or more of first-party services and/or third-party service(s) can be used as training input. The training output can indicate, for each of the first subset of user accounts, whether an occurrence of malicious activity is detected at the SaaS management platform. In so doing, a "baseline" for correlating access activity to malicious activity can be established (e.g., where the trained machine learning model can detect access activity that deviates from the baseline).

In some embodiments, a trained machine learning model of a SaaS management platform (as described above) can be used to classify access information from first-party and/or one or more third party services associated with a particular user account (e.g., user) as a potential occurrence of malicious activity.

As noted, a technical problem addressed by embodiments of the disclosure is a detection of malicious activity, especially malicious activity using a compromised user account.

A technical solution to the above identified technical problem can include training a machine learning model using one or more of information pertaining to accesses of data items by a subset of user accounts. Training inputs can include access information such as one or more of access data for the subset of user accounts, query data for the subset of user accounts, or organizational data associated with the subset of user accounts. The training output can include an indication, for each of the subset of user accounts, whether an occurrence of malicious activity is detected at the SaaS management platform. The data identifying the access information can be acquired from first-party services and from third-party services using APIs provided by the third-party services. The trained machine learning model can be used to determine whether more recent access activity indicates that a user account is engaged in malicious activity.

Thus, the technical effect can include improving the ability of an organization to detect malicious activity, and in particular malicious activity that occurs across first-party and third-party services.

As noted above, malicious activities though an authenticated user account, as described above, can be challenging to detect. For example, a sophisticated malicious actor can access data items at respective SaaS services used by an organization in a way that does not trigger a security response by the respective SaaS service provider in an attempt to avoid detection.

Aspects of the present disclosure address the above-mentioned and other challenges by using multiple machine learning models to determine whether malicious activity for a particular user account has occurred. In some embodiment, a first training machine learning model using initial access information for a user account as input can predict a job title pertaining to the user account. As noted herein, the predicted job title can be used as a "proxy" for the job role corresponding to the user account. The predicted job title (e.g., job role) can be used as a "baseline," such that deviations of access behavior from the baseline can be detected as potential malicious activity.

In some embodiments, a second trained machine learning model can be implemented to determine whether a user account is engaged in malicious activity. The input to the second trained machine learning model can include the predicted job title and access information (e.g., more recent access information) corresponding to the user account. The output of the second trained machine learning model can include an indication of whether access behavior associated with user account corresponds to a potential malicious activity. In some embodiments, by using the predicted job title and recent access information as input to the trained machine learning model, the system can effectively pair a predicted job title having a defined access behavior with recent access information to determine whether the recent access information deviates from the access behavior associated with the predicted job title.

In some embodiments, the second trained machine learning model can be used on a regular interval such that new and updated (e.g., recent) access information is used as input to the second machine learning model. For example, at the end of each day the access information for the particular day can be used as input (along with the predicted job title) to the second machine learning model to predict an occurrence of malicious activity. In some embodiments, a sliding window approach to recent access information can be implemented. For example, at the end of each day the access information from the particular day and previous two days can be used as input to the second trained machine learning model to predict an occurrence of malicious activity.

In some embodiments, the access information can include information from one or more services provided by the SaaS management platform (e.g., first-party and/or third-party service(s)).

As noted, a technical problem addressed by embodiments of the disclosure is a detection of an occurrence of malicious activity for a particular user account, especially malicious activity using a compromised user account.

A technical solution to the above identified technical problem can include training multiple machine learning models to determine whether malicious activity for a particular user account has occurred. The first machine learning model can be trained using access information corresponding to a subset of user accounts. Training inputs can include access information such as one or more of access data for the subset of user accounts, query data for the subset of user accounts, or organizational data associated with the subset of user accounts. The training output can include an indication of a job title. The data identifying access information can be acquired from first-party services and from third-part services using APIs provided by the third-party services. The trained first trained machine learning model can be used to determine a job title for a user account based on access information.

The second machine learning model can be trained using the predicted job title obtained from the first trained machine learning model, and access information corresponding to a subset of user accounts. Training inputs can include information identifying a predicted job title and/or access information. The training output can include an indication, for each of the subset of user accounts, whether an occurrence of malicious activity is detected at the SaaS management platform. The data identifying the predicted job title can be obtained from the output of the first trained machine learn- ing model. The data identifying the access information can be acquired from first-party services and from third-party services using APIs provided by the third-party services. The trained machine learning model can be used to determine whether a user account is engaged in malicious activity based on a predicted job title of the user account and new access information (e.g., recent access information).

Thus, the technical effect can include improving the ability of an organization to detect malicious activity by a particular user account based on a job title associated with the user account (e.g., a predicted job title) and/or recent access information corresponding to the user account.

As used herein, an "organization" can refer to an entity, such as a legal entity that includes multiple people (e.g., organization personnel) that has a particular purpose. Examples of organizations can include government agen- cies, non-profits, corporations (e.g., authorized by law to act as a single entity or legal entity) and partnerships. Multiple organizations can describe one or more organizations that are independent or distinct from the other organizations of the multiple organizations. For example, a first organization can be corporation A and a second organization can be corporation B. Corporation A can be considered an inde- pendent legal entity from corporation B. Each of corporation A and corporation B make independent decisions, have a different hierarchical structure, and use different job titles. A department (or sub-department) can refer to a group within an organization that contributes to an organization's mission or goals. In some embodiments, departments of an organi- zation can be based on the function the department serves within the organization. For example, departments of an organization can include research and development (R&D), Marketing, Legal, Human Resources, Accounting, among other. Each of the various departments can include one or more individuals that perform the function of the respective department.

FIG. 1A illustrates an example of a system 100, in accordance with aspects of the disclosure. The system 100 includes a software-as-a-service (SaaS) management plat- form 120 (also referred to herein as "SaaS management platform 120"), one or more server machines 130-150, a data store 106, and client organization 110A-N (also referred to herein as "client organization 110") connected to network 104. In some embodiments, system 100 can include one or more third-party platforms (not shown).

In embodiments, network 104 can include a public net- work (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) net- work), routers, hubs, switches, server computers, and/or a combination thereof.

Data store 106 can be a persistent storage that is capable of storing access information. Access information can include information pertaining to accesses of data items, such as accesses of data items at a SaaS management platform 120. Access information can include access data, query data, and/or organizational data as well as data struc- tures to tag, organize, and index the access information. Data store 106 can be hosted by one or more storage devices, such as main memory, magnetic or optical storage based disks, tapes or hard drives, network-attached storage (NAS), stor- age area network (SAN), and so forth. In some embodi- ments, data store 106 can be a network-attached file server, while in other embodiments the data store 106 can be another type of persistent storage such as an object-oriented database, a relational database, and so forth, that can be hosted by SaaS management platform 120, or one or more different machines coupled to the server hosting the SaaS management platform 120 via the network 104. In some embodiments, access information can include information related to human resources (HR) for an organization. In some embodiments, data store can be capable of storing one or more data items 125, as well as data structures to tag, organize, and index the data items 125. A data item can include various types of data including structured data, unstructured data, or types of digital files, including text data, audio data, image data, video data, multimedia, inter- active media, data objects, and/or any suitable type of digital resource, among other types of data. An example of a data item can include a file, database record, programming code, or document, among others.

As described above, access information can include access data. Access data can refer to information corre- sponding to accesses of data items (e.g., data items 125) at a platform, such as SaaS management platform 120, and/or accesses of data items at a service, such as third-party SaaS service 122A-N (e.g., via SaaS management platform 120). It can be noted that third-party services, such as third-party SaaS services 122A-122N (also referred to herein as "third- party SaaS service 122") can be accessed via SaaS manage- ment platform 120. Access data can include, for example, a data item identifier, a data item access type (e.g., read, write, download, copy, send, or share), data access time periods, data access frequencies, and/or device identifiers for devices used to access respective data items. Additional details regarding access data are described with reference to FIG. 2.

As described above, access information can include query data. Query data can refer to information pertaining to search queries performed by user accounts (e.g., user accounts 113A-N) at a platform (e.g., SaaS management platform 120), and/or search queries performed at a service (e.g., third-party SaaS service 122). Additional details regarding access data and query data are described with reference to FIG. 2.

As described above, access information can include orga- nizational data. Organizational data can include, but is not limited to, a job title, a job title level (e.g., "entry, (L1)"), a department, or sub-department. In some embodiments, the job title can correspond to the job title associated with the user account having accessed the data item(s). In some embodiments, the department can correspond to the depart- ment associated with the user account having accessed the data item(s). Additional details regarding access information are described below with reference to FIG. 2.

A client organization (e.g., a client organizations 110) can refer to an organization that uses the services provided by the SaaS management platform 120. The client organiza- tions 110A-N can each include one or more computing devices such as personal computers (PCs), laptops, mobile phones, smart phones, tablet computers, netbook computers, network-connected televisions, etc. In some embodiments, a client organizations 110 can include user devices 111A-N (also referred to herein as "user devices 111") which may also be referred to as "client devices."

In some embodiments, SaaS management platform 120 can provide one or more organizational accounts (not shown) that are assigned to a particular organization, such as a client organization 110A. For example, corporation A can be assigned organizational account A. In some embodiments, SaaS management platform 120 can provide an organizational account with one or more user accounts. For example, organizational account A can be a root account and user accounts 113A-113N can be under the root account in a hierarchical structure. In some embodiments, a client organization 110 (or SaaS management platform 120) can assign user accounts 113A-N to respective users within the organization. User accounts 113A-N (also generally referred to herein as "user account 113") can be used to access SaaS management platform 120 via user devices 111A-N. A "user" can be an individual of the organization associated with a respective user account 113. In some embodiments, aspects of the disclosure encompass a "user" being an entity controlled by a group of organization personnel and/or an automated source. For example, a group of organization personnel federated as one or more departments in an organization can be considered a "user." Each user account 113 can be assigned authorization credentials to access the SaaS management platform 120 (e.g., a username and password) and further use authentication credentials (e.g., an access token, etc.) to access specific services provided thereby. In some embodiments, user accounts 113A-N can include enhanced privileges (e.g., administrator accounts, information technology (IT) specialist accounts, etc.).

The SaaS management platform 120 can be a platform that can provide services to one or more client organizations 110A-N. The SaaS management platform 120 can be accessible, at least in part, by one or more user accounts 113A-N provided or assigned to client organization 110 by SaaS management platform 120. As described above, a user account 113 can access the SaaS management platform 120 by providing authentication credentials via an application on a user device 111 of the client organization 110. The SaaS management platform 120 can provide one or more services to a user device 111 associated with the user accounts 113 that has provided proper authentication credentials.

In some embodiments, the SaaS management platform 120 can include one or more third-party SaaS services 122A-N. In some embodiments, the SaaS management platform 120 can include one or more first-party services, illustratively shown as SaaS management platform services 129. When a user device 111 associated with a user account 113 accesses the SaaS management platform 120, the SaaS management platform 120 can provide the user device 111 with access to one or more services (e.g., one or more third-party SaaS services 122A-N) based on the particular service authorization associated with the user account. One or more data item(s) 125 can be accessed via the authorized services. In some embodiments, the user device 111 can access the data item 125 using one or more of the SaaS management platform services 129. In some embodiments, the user device 111 can access the data item 125 using one or more third-party SaaS services 122. The user device 111 receives a data item 125 from the SaaS management platform 120 in response to a request for the data item. In some embodiments, the SaaS management platform 120 can function as a "black box" with respect to the user device 111. That is, regardless of the original source of the data item 125 (e.g., whether from the SaaS management platform service 129, or from one or more third-party SaaS services 122A-N) the user device 111 can receive the data item 125 as if the data item 125 originated from the SaaS management platform 120. For example, the SaaS management platform 120 can include a third-party SaaS service 122 that digital resource management services to a client organization 110, or the functionality to deploy services of the third-party SaaS service 122 such as software applications to a client organization 110 for an on-demand service. In another example, the SaaS management platform can include a third-party SaaS service 122 that can deliver and/or license software applications on a subscription basis while the third-party SaaS service 122 hosts, at least in part, the software application. In some embodiments, the licensed software applications can, at least in part, be hosted on the infrastructure, such as the cloud computing resources of the third-party SaaS service 122. Examples of software applications provided to the SaaS management platform by one or more third-party SaaS services 122 can include a database management SaaS service, a software suite SaaS service, a human resources SaaS service, etc.

In the illustrated example, a user device 111 can access the SaaS management platform 120 through network 104 using one or more application programming interface (API) calls via platform API endpoint 121. In some embodiments, SaaS management platform 120 can include multiple platform API endpoints 121 that can expose services, functionality, or services of the SaaS management platform 120 to one or more user devices 111A-N of a client organization 110. In some embodiments, a platform API endpoint 121 can be one end of a communication channel, where the other end can be another system, such as a user device 111 associated with a user account 113 of a client organization 110. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP or HTTPS methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or data items 125 provided by the SaaS management platform 120. The platform API can be used in programmatically obtaining one or more data items 125 associated with a request for services and/or data items 125. In some embodiments, the platform API is implemented in connection with a multitenant communication service wherein different accounts (e.g., authenticated entities such as user accounts 113A-N) can submit independent requests. These requests made using API calls via Platform API endpoint 121 can be managed with consideration of other requests made within a user account 113 and/or across multiple user accounts (e.g., user accounts 113A-N) on the SaaS management platform 120.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the SaaS management platform 120 can expose through the API, a set of API resources which when addressed can be used for requesting different actions, inspecting state or data, and/or otherwise interacting with the SaaS management platform 120. In some embodiments, a REST API and/or another type of API can work according to an application layer request and response model. An application layer request and response model can use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the SaaS management platform 120 can observe the principles of a RESTful design or the protocol of the type of API. RESTful is understood in this document to describe a Representational State Transfer architecture. The RESTful HTTP requests can be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the platform API endpoint 121 can include an access request instruction module (e.g., access request module) that can be called within an application, script, or other computer instruction execution. For example, a computing platform can support the execution of a set of program instructions where at least one instruction within a script or other application logic is used in specifying an access request and communicating that request. In some embodiments, the platform API endpoint 121 can include a console, administrator interface, or other suitable type of user interface. Such a user-facing interface can be a graphical user interface (GUI). Such a user interface can additionally work in connection with a programmatic interface.

In some embodiments, the platform API request (e.g., API call to platform API endpoint 121) can include a data object characterizing the properties of one or more services and/or data items 125 to be accessed. In some embodiments, the platform API request can be associated with other API requests (e.g., API calls to API endpoints 123A-N) that are programmatically initiated by SaaS management platform 120 (e.g., via SaaS management platform services 129). In some embodiments, the platform API request can be initiated from another (e.g., previous) access request. In some embodiments, service API requests to API endpoints 123A-N can be programmatically initiated from platform API requests to platform API endpoint 121. For example, the SaaS management platform 120 can receive a platform API request for a data item 125 that is provided by or hosted on a third-party SaaS service 122. The SaaS management platform services 129 can programmatically initiate a service API request to the API endpoint 123A-N of the respective one or more third-party SaaS services 122A-N corresponding to the requested data item 125. In some embodiments, the SaaS management platform 120 can offer third-party services (and first-party services) by making only platform API requests (received through platform API endpoint 121) available to end users (e.g., users of user accounts 113A-N).

In the illustrated example, a user device 111 associated with a user account 113 can send a platform API request to the SaaS management platform 120 for a data item 125 through platform API endpoint 121. The platform API request can be processed by the SaaS management platform 120 at platform API endpoint 121. Based on the contents or nature of the request, the SaaS management platform 120 can determine the source of the data item 125 that has been requested by the client device (e.g., by using SaaS management platform service 129). If the data item 125 is available from the SaaS management platform service 129 then the SaaS management platform 120 can provide the data item 125 to the user device 111 without making a third-party API call to an API endpoint 123A-123N. If the data item 125 is available from a third-party SaaS service 122, the SaaS management platform 120 can generate and send a service API request to the respective third-party SaaS service 122A-N through the corresponding API endpoint 123A-N. Responsive to receiving the data item 125 from the third-party SaaS service 122 (in response to the generated service API request), the SaaS management platform services 129 can provide the data item 125 to the user device 111. In some embodiments, an API request (e.g., platform API call) sent by the user device 111 does not identify a service API call to a third-party SaaS service 122 or corresponding API endpoints 123A-N. In other embodiments, an API request sent by user device 11 does identify a service API call to a third-party SaaS service 122. For example, the user device can directly access a third-party SaaS service 122 using service API calls provided by the third-party service.

In some embodiments, SaaS management platform services 129 can provide one or more services that includes access to a data item 125. In some embodiments, SaaS management platform services 129 can also include a machine learning model module 151. FIG. 1B illustrates machine learning model module 151. In some embodiments machine learning model module 151 can include one or more of job title sub-module 151A, malicious activity sub-module I 151B, and malicious activity sub-module II 151C. In the illustrated example, machine learning model module 151 includes job title sub-module 151A, malicious activity sub-module I 151B and malicious activity sub-module II 151C.

Returning to FIG. 1A, by facilitating the access to data items 125 at third-party SaaS services 122A-N and SaaS management platform service 129, SaaS management platform 120 can obtain access information corresponding to user accounts 113A-N. In some embodiments, the machine learning model module 151 can collect, and process access information associated with third-party SaaS services 122A-N and SaaS management platform service 129 that corresponds to one or more user accounts 113A-N. It can be noted that machine learning model module 151 can collect access information for each third-party SaaS service 122 accessed by a user account 113 (e.g., access data and/or query data). That is, for a given user account 113, machine learning model module 151 can collect access information pertaining to SaaS management platform service 129 and one or more third-party SaaS services 122A-N accessed by the user account 113. In some embodiments, the machine learning model module 151 can perform aspects of the present disclosure. In some embodiments, machine learning model module 151 can include one or more trained models (e.g., model(s) 160). For example, and in some embodiments, job title sub-module 151A can include a model 160A, malicious activity sub-module I 151B can include a model 160B, and malicious activity sub-module II 151C can include a model 160C. The machine learning model module 151 can obtain the inputs for the model 160 and provide the obtained inputs to the model 160. The machine learning model module 151 can receive the outputs from the model 160. In some embodiments, the model 160 (e.g., trained models) can receive access information associated with a user account (e.g., a user account 113A-N) as input, and provide as output, a prediction of a job title and/or department, along with a level of confidence that the job title and/or department corresponds to the access information associated with the user account. It can be noted that model 160 can refer to one or more machine learning models as described herein.

In some embodiments, a user device, such as user device 111A, can implement or include one or more applications, such as application 119 (also referred to as "client application" herein) executed at user device 111A. In some embodiments, application 119 can be used to communicate (e.g., send and receive information) with SaaS management platform 120. In some embodiments, application 119 can implement user interfaces (e.g., graphical user interfaces (GUIs)) that may be webpages rendered by a web browser and displayed on the user device 111A in a web browser window. In another embodiment, the user interfaces of application 119 may be included in a stand-alone application downloaded to the user device 111A and natively running on the user device 111A (also referred to as a "native application" or "native client application" herein). In some embodiments, machine learning model module 151 can be implemented as part of application 119. In other embodiments, machine learning model module 151 can be separate from application 119 and application 119 can interface with machine learning model module 151.

Server machine 130 includes a training set generator 131 that is capable of generating training data (e.g., a set of training inputs and a set of target outputs) to train a model 160. In some embodiments, training set generator 131 can generate the training data based on training input access information corresponding to a user account 113 (e.g., stored at data store 106 or another data store connected to system 100 via network 104). For example, training data can be generated based on historical access information corresponding to various user accounts 113A-N. In some embodiments, training set generator 131 can determine access information of a user account 113 is associated with one or more job titles and can generate a mapping between the access information of the user account 113 and the one or more job titles associated with a particular organization. Data store 106 can store metadata associated with the training data.

Server machine 140 includes a training engine 141 that is capable of training a model 160 using the training data from training set generator 131. The model 160 (also referred to "machine learning model" or "artificial intelligence (AI) model" herein) may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the model 160 that captures these patterns. The model 160 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. In some embodiments, the model 160 can refer to the model artifact that is created by training engine 141 using training data that includes training inputs and, in some cases, training outputs. Training engine 141 can find patterns in the training data, identify clusters of data that correspond to the identified patterns, and provide the model 160 that captures these patterns. Model 160 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience, the remainder of this disclosure will refer to the implementation as a neural network, even though some implementations may employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data. Details regarding generating training data to train the model 160 are provided with reference to FIGS. 2-3.

In some embodiments, training data, such as training input and/or training output, and/or input data to a trained machine learning model (collectively referred to as "machine learning model data" herein) can be preprocessed before providing the aforementioned data to the (trained or untrained) machine learning model for execution. Preprocessing can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, the training set is obtained from server machine 130. Server machine 150 includes a machine learning model module 151 that provides current data (e.g., access information) as input to trained machine learning model (e.g., model 160) and runs the trained machine learning model (e.g., model 160) on the input to obtain one or more outputs. As described in detail below with respect to FIG. 4A-B, in one embodiment, the machine learning model module 151 is also capable of identifying one or more job titles from the output of the trained model (e.g., model 160), and extract confidence data from the output that indicates a level of confidence that one or more of the job titles corresponds to the access information corresponding to a user account 113. Additionally, in some embodiments, the machine learning model module 151 is capable of identifying one or more departments from the output of the trained model, and extract confidence data from the output that indicates a level of confidence that one or more of the departments corresponds to the access information corresponding to a user account 113.

In some embodiments, confidence data can include or indicate a level of confidence of that access information corresponding to a user account 113 corresponds to a particular job title. In one example, the level of confidence is a real number between 0 and 1 inclusive, where 0 indicates no confidence that access information corresponding to the user account 113 corresponds to the job title and 1 indicates absolute confidence that access information corresponding to the user account 113 corresponds to the job title.

In some embodiments, the SaaS management platform 120 or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the SaaS management platform 120 (e.g., through SaaS management platform services 129 and/or one or more third-party SaaS services 122). The SaaS management platform 120 can also include a website (e.g., a webpage) or application back-end software that can be used to provide user with access to the SaaS management platform 120.

In some embodiments, one or more of server machine 130, server machine 140, model 160, server machine 150 can be part of SaaS management platform 120. In other embodiments, one or more of server machine 130, server machine 140, server machine 150, or model 160 can be separate from SaaS management platform 120 (e.g., provided by a third-party service provider).

Also as noted above, for purpose of illustration, rather than limitation, aspects of the disclosure describe the training of a machine learning model (e.g., model 160) and use of a trained machine learning model (e.g., model 160). In other embodiments, a heuristic model or rule-based model can be used as an alternative. It should be noted that in some other embodiments, one or more of the functions of SaaS management platform 120 can be provided by a greater number of machines. In addition, the functionality attributed to a particular component of the SaaS management platform 120 can be performed by different or multiple components operating together. As described above, the SaaS management platform 120 can also be accessed as a service provided to other systems or devices through various implementations of platform API endpoints, and thus is not limited to use in websites. Although embodiments of the disclosure are discussed in terms of SaaS management platforms, embodiments can also be generally applied to any type of platform or service.

In situations in which the systems discussed here collect personal information about users, or can make use of personal information, the users can be provided with an opportunity to control whether or how the SaaS management platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the SaaS management platform 120.

Figure 2:
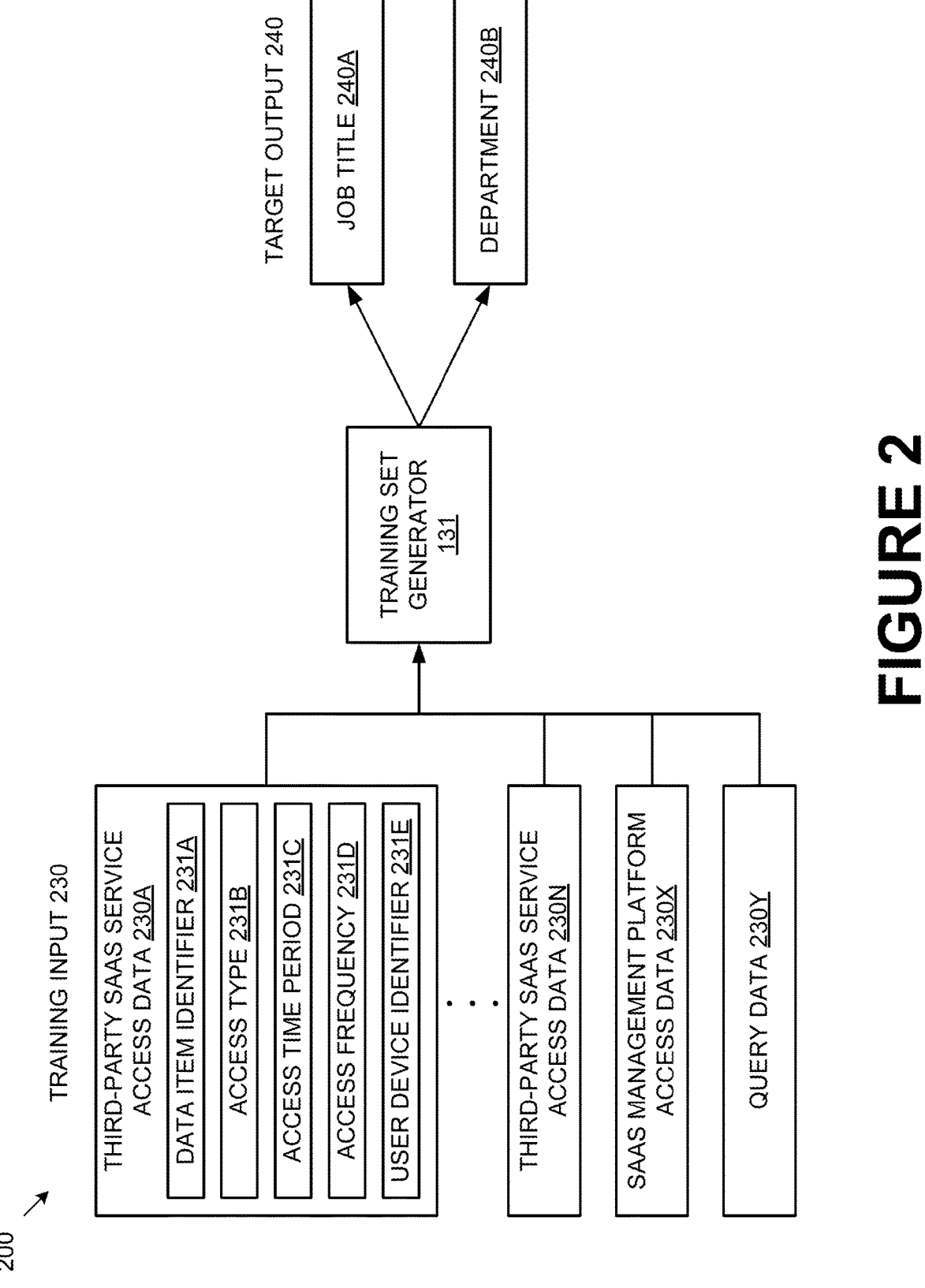
FIG. 2 is an example training set generator to create training data for a machine learning model using information pertaining to accesses of data items of a SaaS management platform, in accordance with aspects of the disclosure.

FIG. 2 is an example training set generator to create training data for a machine learning model using information pertaining to accesses of data items at a SaaS management platform, in accordance with aspects of the disclosure. System 200 shows training set generator 131, training inputs 230, and target outputs 240. System 200 can include similar components as system 100, as described with respect to FIG. 1A. Components described with respect to system 100 of FIG. 1A can be used to help describe system 200 of FIG. 2. In some embodiments, system 200 can illustrate training inputs 230 and target outputs 240 used to train the model 160A, to be used by the job title sub-module 151A.

In embodiments, training set generator 131 generates training data that includes one or more training inputs 230, and one or more target outputs 240. The training data can include mapping data that maps the training inputs 230 to the target outputs 240. Training inputs 230 can be referred to as "features," "attributes," or "information." In some embodiments, training set generator 131 can provide the training data in a training set, and provide the training set to the training engine 141 where the training set is used to train the model 160. Generating a training set is further described with reference to FIG. 3. In some embodiments, training inputs 230 can include third-party SaaS service access data 230A third-party SaaS service access data 230N, SaaS management platform access data 230X, and query data 230Y associated with multiple user accounts (e.g., user accounts 113A-N). In some embodiments, training inputs 230 can be associated with a particular client organization, such as client organization 110A. For example, a first machine learning model can be trained using training set generator 131 using only the organizational data of client organization 110A. In some embodiments, each client organization 110A-N can use the respective organizational data to train respective machine learning models using training set generator 131. In some embodiments, a machine learning model can be trained using the organizational data of multiple client organizations 110A-N.

In some embodiments, third-party SaaS service access data 230A-N or query data 230Y can correspond to access information associated with services provided by a third-party SaaS service 122A (and associated with accesses by a particular client organization, such as client organization 110A). In some embodiments, third-party SaaS service access data 230N can correspond to access information corresponding to services provided by a third-party SaaS service 122N (and associated with accesses by a particular client organization, such as client organization 110A). In some embodiments, SaaS management platform 120 can use API calls to obtain access information from each of the third-party SaaS services 122A-N. In some embodiments, each of the API calls for each third-party SaaS service 122A-N can be specific to the respective service provider.

In some embodiments, SaaS management platform access data 230X or query data 230Y can correspond to access information corresponding to services provided by SaaS management platform service 129 of SaaS management platform 120 (and to a particular client organization, such as client organization 110A).

It can be noted that for the sake of brevity and clarity, the access information such as data item identifier 231A, access type 231B, access time period 231C, access frequency 231D, and user device identifier 231E (and query data 230Y) is illustrated as pertaining to third-party SaaS service access data 230A (e.g., pertaining to a third-party SaaS service 122A). In some embodiments, one or more of third-party SaaS service access data 230B-N or SaaS management platform access data 230X can also have similar access information. For example, third-party SaaS service access data 230A can pertain to third-party SaaS service 122A, and have a specific data item identifier 231A for a particular data item, and third-party SaaS service access data 230N can pertain to third-party SaaS service 122N, and have a different specific data item identifier for a different data item. Similarly, in some embodiments, query data 230Y can include distinct query data for each of third-party SaaS services 122A-N and SaaS management platform service 129. In other embodiments, query data 230Y can be query data that pertains two or more or third-party SaaS services 122A-N and SaaS management platform service 129.

Access data inputs (e.g., third-party SaaS service access data 230A, third-party SaaS service access data 230N, and SaaS management platform access data 230X) can include one or more types of access data 231. In an illustrative example, access data 231 includes data item identifier 231A, access type 231B, access time period 231C, access frequency 231d, and user device identifier 231E.

Data item identifier 231A can refer to an identifier of a data item. In some embodiments, a data item identifier 231A of a data item can include one or more of a name of the data item (e.g., file name), an identifier indicating a location at which the data is stored (e.g., file path, database location, etc.), an identifier indicating the type of media of the data item (e.g., text, audio, video), and/or an identifier indicating a certain file format or extension of the data item 125 (e.g., file extensions such as .mp3 or .txt). In some embodiments, data item identifier 231A can additionally include an indication of the source (e.g., original source) of the data item 125, such as SaaS management platform service 129 (e.g., SaaS management platform 120), or one of the third-party SaaS services 122.

Access type 231B can refer to a type of access to a data item requested by a particular user account. The types of access can include, but is not limited to, one or more of a read access, a write access, a copy access, a download access, or a share access. Read access can refer to a request to retrieve and view contents of the data item 125 by a user account. Write access can refer a request to create, modify and/or update contents of a data item 125 by a user account. Copy access can to a request to duplicate or make a copy to of a data item 125 by a user account. In some embodiments, copy access can include information identifying a particular destination for the digital duplication. Download access refer to a request to retrieve and save a copy of the data item 125 from a remote source (e.g., SaaS management platform 120) to a local device or system (e.g., user device 111). Share access can refer to a request distribute or grant access of the data item 125 to other user accounts, devices, individual or entities. For example, a share access of a data item 125 can include providing a link to the data item 125 to another user device 111 in the same client organization or an external device that is not a part of the same client organization.

In some embodiments, an access type can include a file indexing access type (e.g., "spidering"). File indexing can refer to accessing (e.g., scan) of a directory to obtain information on the directory, such as information on the directory structure or information on the file attributes (e.g., file name, size, date created, date modified, etc.) for files within the directly. File indexing can also refer to accessing websites and the directory structure of the websites. For sample, file indexing can collect information about web pages, content of web pages, and links (e.g., URI) in web pages. For example, a user account 113 engaged in a file indexing access type can access a directory that contains links to access one or more data items, such as a data item 125. By causing a link to access a data item 125 to be selected, the user account can access the respective data item. In some embodiments, a directory can include one or more links to sub-directories, and by causing a link to a sub-directory to be selected, the user account can access the respective sub-directory. In some embodiments, the file indexing access type can include accesses of data items 125 through links in other data items (similar to links to data items 125 provided in a directory). For example, a user account 113 can engage in a file indexing access type when selecting a first data item (e.g., a data item 125) or link to access a first data item from a directory, or from a second data item (e.g., a data item 125). Subsequently, if the selected first data item includes a link to a third data item (e.g., a data item 125), the user account 113 can then access the third data item through the link in first data item, and so on. In this way, the user account 113 can access one or more data items 125 of the SaaS management platform services and/or data items 125 of the third-party SaaS services 122A-N through a file indexing access type.

Access time period 231C can refer information indicating a time (e.g., month, day, year, hour, and or second) corresponding to an access (e.g., access type) of a data item 125. Access time period 231C can include one or more an access time (e.g., time stamp indicating a time the data item 125 was "opened"), a release time (e.g., time stamp indicating time the data item 125 was "closed"), a duration time (e.g., the difference between the access time and the release time), a time of day, a date, a day of the week, a day of the month, or a day of the year. In some embodiments, an access time period 231C can be obtained from from SaaS management platform 120 and/or from third-party SaaS services 122. In some embodiments, an access time period 231C can be extracted from other software applications used by a user on a user device 111 associated with a user account 113 (e.g., document creation software, email software, calendaring software, or operating system software). In some embodiments, an access time period 231C can be compared against time data associated with the user account 113 for a consideration of whether an access time period 231C indicates a potentially malicious activity. For example, time data in a calendaring software application associated with the user account 113 can indicate a user work-day schedule, including out-of-office times (such as for vacation, or on weekends). An access time period 231C that corresponds to time data indicating the user is out-of-office (e.g., a calendared vacation) can be indicative of potentially malicious activity.

Access frequency 231D can refer to a frequency a data item (e.g., data item 125), is accessed over a period of time. In some embodiments, the access frequency 231D can include the frequency a data item 125 is accessed over a period of time using any access type (e.g., access type 231B). In some embodiments, the period of time can be based on, or related to an access time period 231C. For example, data item 125 has an access frequency 231D of eighty-five times (e.g., read access, write access, share access) over a week period. In some embodiments, the access frequency 231D can include a frequency a data item is accessed over a period of time using a particular one or more access types. In some embodiments, the access frequency 231D can be granular with respect to access types. For example, user account A performs a read access sixteen times on data item 125 within time period A, and a share access of data item 125 forty times within time period A. In some embodiments, the period of time can be configured based on preferences of the client organization 110. In some embodiments, the period of time can be configured by the SaaS management platform 120.

User device identifier 231E can refer to an identification of the device that is used to access a data item 125. In some embodiments, the device can be a user device 111 of a client organization 110. In some embodiments, the device can be an external device such as a personal device of a user or a peripheral device, such as a universal serial bus (USB) device.

As described above, training input 230 can include query data 230Y. Query data 230Y can refer to information related to (e.g., generated or collected) or describing the conducing of queries or searches using a database, search engine or other information retrieval system. For example, query data 230Y can include one or more of query terms, search history, timestamps related to the query, results of the query, and so forth. In some embodiments, query data 230Y can include data corresponding to searches performed by a user account 113 at the SaaS management platform 120. In some embodiments, query data 230Y can include data corresponding to searches performed by the user account 113 at one or more third-party SaaS services 122A-N. Query data 230Y can be based on, for example, text-based queries entered into an indexing-style search system provided by the SaaS management platform 120. In some embodiments, query data 230Y can include additional user inputs, such as text-based document input, text-based search queries entered into an indexing-style search system corresponding to a user device 111 or operating system of a user device 111, text-based search queries entered into an indexing-style search system for performing internet searches, or other types of text-based input processed on the user device 111 corresponding to a user account 113. In some embodiments, query data 230Y can include non-text-based search queries such as image-, audio-, or video-based search queries.

In some embodiments, query data 230Y can include database lookup queries formatted in structured language or programming code. For example, search queries can include database lookup queries formatted in structured query language (SQL). In some embodiments, query data 230Y can include other query input types, including image searches, video searches, audio searches, etc. Query data 230Y can include requests sent by a user device 111 to one or more databases that are not received as text-based input from a user of a user device 111. For example, a query request can be populated from a file, or by copying text from one location into the query request input location. In another example, queries can be initiated through one or more automated, or semi-automated commands based on user selections with, for example, a cursor.

In some embodiments, target outputs 240 can include one or more of job title 240A or department 240B associated with a client organization 110. A job title can refer to a name of an organization-specific personnel position (e.g., organization-specific job role) that is associated with a particular organization. For example, organization A can have an organization-specific personnel position with the job title, "Director of Engineering." The job title can point to an organization-specific personnel position within particular organization's organizational hierarchy. An organizational hierarchy can refer to the organization of people within an organization according to job function or some other criteria. In some embodiments, organization-specific personnel position(s), as described herein can refer to personnel positions that are associated with a particular organization. Personnel position(s), as used herein, can refer to a personnel position that is associated with a department (or job sub-department).

In some embodiments, target output 240 includes a department 240B. In some embodiments, the department 240B can correspond to a job title 240A. For example, the job title "human resources director" of organization A can correspond to the "human resources department" of organization A. In another example, the job tile "digital design engineer" of organization B can correspond to the "research and development (R&D) department" of organization B. In some embodiments, one or more of the departments can be non-standardized departments. A non-standardized department can refer to a name of a department of an organization that is not standardized across the client organizations 110A-N.

In some embodiments, subsequent to generating a training set and training the model 160 using the training set, the model 160 can be further trained (e.g., additional data for a training set) or adjusted (e.g., adjusting weights associated with input data of the model 160, such as connection weights in a neural network). In some embodiments, the model 160 can be trained on additional training inputs (not illustrated) and additional target outputs (not illustrated).

Figure 3:
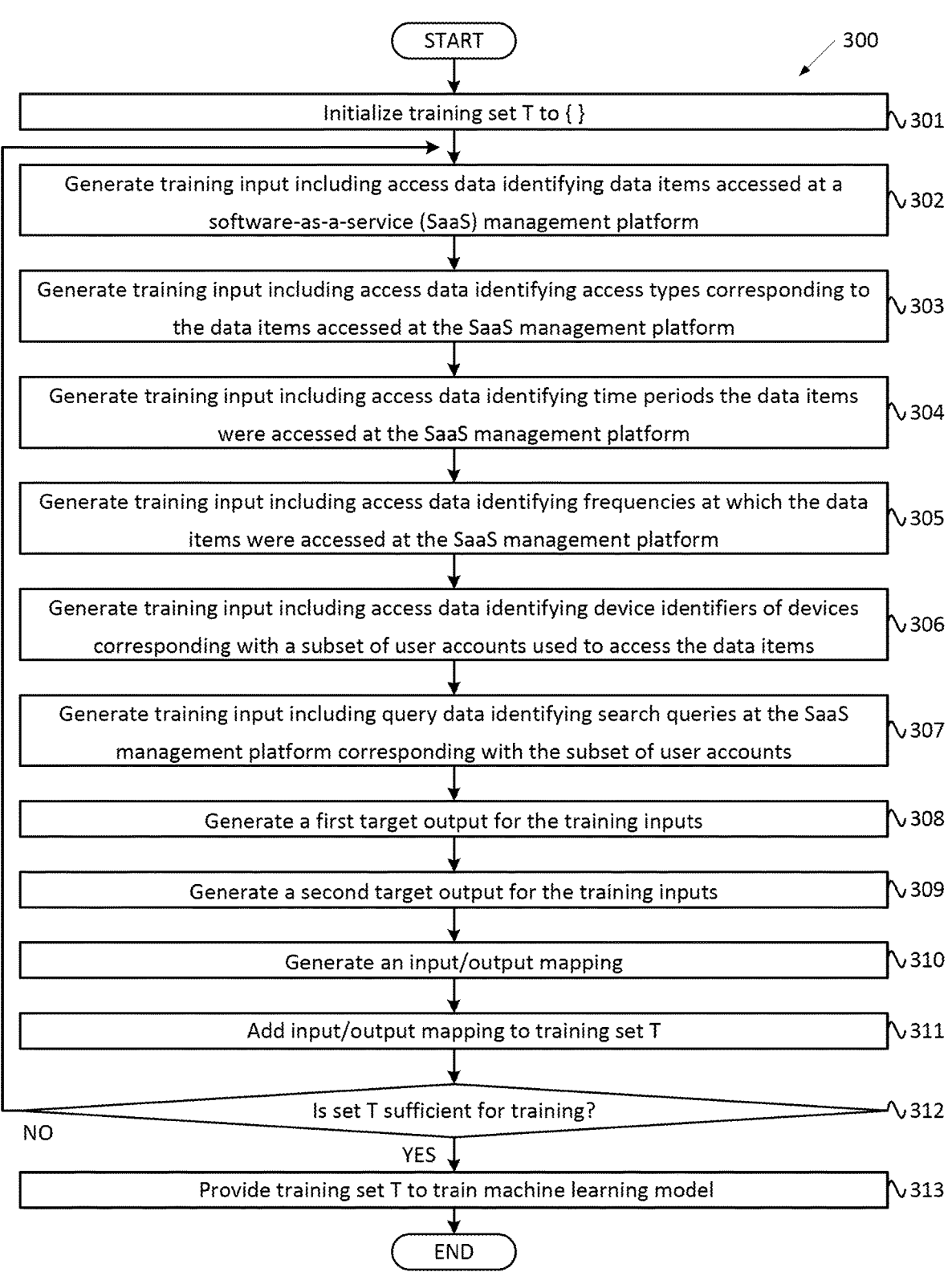
FIG. 3 depicts a flow diagram of one example method for training a machine learning model, in accordance with aspects of the disclosure.

FIG. 3 depicts a flow diagram of one example of a method 300 for training a machine learning model, in accordance with aspects of the disclosure. The method is performed by processing logic that can include hardware (circuitry, dedicated logic, etc.), software (e.g., instructions run on a processing device), or a combination thereof. In one embodiment, some or all the operations of method 300 can be performed by one or more components of system 100 of FIG. 1A. In other embodiments, one or more operations of method 300 can be performed by training set generator 131 of server machine 130 as described with respect to FIGS. 1A-2. It can be noted that components described with respect FIGS. 1A-2 can be used to illustrate aspects of FIG. 3. In some embodiments, the operations (e.g., operations 301-311) can be the same, different, fewer, or greater. For instance, in some embodiments one or more training inputs can be generated or one or more target outputs can be generated, and the one or more training inputs and one or more training outputs can be used as input-output pairs (for input) to train the machine learning model, such as model 160A, to be used by the job title sub-module 151A.

Method 300 generates training data for a machine learning model. In some embodiments, at operation 301, processing logic implementing the method 300 initializes the training set "T" to an empty set (e.g., "{ }").

At operation 302, processing logic generates training input including access data identifying data items accessed at a software-as-a-service (SaaS) management platform such as SaaS management platform 120 as described with reference to FIG. 1A (e.g., as described with reference to SaaS management platform access data 230X of FIG. 2).

At operation 303, processing logic generates training input including access data identifying access types corresponding to the data items accessed at the SaaS management platform 120 (as described with reference to access type 231B of FIG. 2).

At operation 304, processing logic generates training input including access data identifying time periods the data items were accessed at the SaaS management platform 120 (as described with reference to access time period 231C of FIG. 2).

At operation 305, processing logic generates training input including access data identifying frequencies at which the data items were accessed at the SaaS management platform 120 (as described with reference to access frequency 231D of FIG. 2).

At operation 306, processing logic generates training input including access data identifying device identifiers of user devices corresponding with a subset of user accounts used to access the data items at the SaaS management platform 120 (as described with reference to user device identifier 231E of FIG. 2).

At operation 307, processing logic generates training input including query data identifying search queries at the SaaS management platform corresponding with the subset of user accounts (as described with reference to query data 230Y of FIG. 2).

It can be noted that the access information used as training input to train the machine learning model (e.g., access data of operation 302 through operation 306, and query data) can pertain to any of the SaaS management platform services 129 and/or one or more third-party SaaS services 122A-N provided to a user through the SaaS management platform 120, in some embodiments. In some embodiments, operations 302-308 can include access information pertaining to a first SaaS service. In embodiments having multiple SaaS services, operations 302-307 can be repeated using access information pertaining to each respective SaaS service of the multiple SaaS services. In this way, access information for multiple SaaS services used by a single user account can be aggregated into a set of training inputs for training the machine learning model.

At operation 308, processing logic generates a first target output for one or more of the training inputs (e.g., training inputs one through seven). The first target output identifies for each user of the subset of user accounts, information identifying a respective job title 240A. As described above, the job title 240A is based on accesses of data items at the SaaS management platform 120.

At operation 309, processing logic generates a second target output for one or more of the training inputs (e.g., training inputs described in operation 302 through operation 307). The second target output identifies, for each of the subset of user accounts, information identifying a respective department 240N. In some embodiments, department 240N can correspond to the job title 240A.

At operation 310, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s). At operation 311, processing logic adds the mapping data generated at operation 310 to training set T.

At operation 312, processing logic branches based on whether training set T is sufficient for training the model 160. If so, execution proceeds to operation 313, otherwise, execution continues back at operation 302. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 313, processing logic provides training set T to train the machine learning model (e.g., model 160). In one embodiment, training set T is provided to training engine 141 of server machine 140 to perform the training. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After operation 313, the machine learning model (e.g., model 160) can be trained using training engine 141 of server machine 140. The trained machine learning model (e.g., model 160) can be implemented by job title sub-module 151A of the machine learning model module 151 (of server machine 150 or SaaS management platform 120) to determine one more of the job titles or departments corresponding to accesses of data items at the SaaS management platform 120.

FIG. 4A depicts a flow diagram of one example of a method 400 for using a trained machine learning model to predict job titles, using information pertaining to accesses of data items of a SaaS management platform, in accordance with aspects of the disclosure. The method 400 is performed by processing logic that can include hardware (circuitry, dedicated logic, etc.), software (e.g., instructions run on a processing device), or a combination thereof. In one embodiment, some or all the operations of method 400 can be performed by one or more components of system 100 of FIGS. 1A-B, such as job title sub-module 151A of the machine learning model module 151. It can be noted that components described with respect FIGS. 1A-B can be used to illustrate aspects of FIG. 4A. In some embodiments, the operations (e.g., operations 401-405) can be the same, different, fewer, or greater. For instance, in some embodiments one or more training inputs can be generated or one or more target outputs can be generated. Method 400 uses the trained machine learning model (e.g., model 160A) to predict job titles based on access information.

At operation 401, processing logic implementing the method 400 provides to the trained machine learning model an input that include information identifying data items accessed at the SaaS management platform using a user account associated with the client organization. After operation 401, processing logic can optionally perform one or more of the operations depicted in FIG. 4B, below. Additional details regarding the operations of 4B are described below with reference to FIG. 4B.

It can be noted that the access information used as input for the machine learning model can be from one or more of the third-party SaaS services 122A-N and/or the SaaS management platform service(s) 129, in some embodiments. In some embodiments, the access information as described in operation 401 and the operations of FIG. 4B can be repeated for access information for one or more of the third-party SaaS services 122A-N and/or the SaaS management platform service(s) 129 as deemed relevant.

At operation 402, after performing operation 401, or, alternatively, after performing one or more of the operations depicted in FIG. 4B, processing logic obtains, from the trained machine learning model, one or more outputs identifying (i) an indication of a first job title associated with the client organization, and (ii) a level of confidence that the first job title corresponds to the user account.

Alternatively, in parallel to, or serially with operations 402-404, processing logic can perform one or more of the operations 471-473 depicted in FIG. 4C. Additional details regarding the operations of operation 4C are described below with reference to FIG. 4C.

At operation 403, processing logic determines whether the level of confidence that the first job title corresponds to the user account satisfies a threshold level of confidence. If the level of confidence that the first job title corresponds to the user account does not satisfy the threshold level of confidence, processing logic returns to operation 401. If the level of confidence that the first job title corresponds to the user account does satisfy the threshold level of confidence, processing logic proceeds to operation 404.

At operation 404, responsive to determining the level of confidence that the first job title corresponds to the user account satisfies the threshold level of confidence, processing logic determines whether the first job title is different from a second job title associated with the user account. If the first job title is not different from the second job title associated with the user account, processing logic returns to operation 401. If the first job title is different from the second job title associated with the user account, processing logic proceeds to operation 405. In some embodiments, processing logic can determine the first job title (e.g., the predicted job title) is different from the second job title (e.g., the job title originally assigned by the organization or earlier determined using a trained machine learning model) if the first job title is not the same or similar to the second job title. Additional differentiation techniques are also considered. For example, and in some embodiments, a second machine learning model can be used to evaluate the differences between the first job title (e.g., the predicted job title) and the second job title (e.g., the job title associated with the user account).

In some embodiments, responsive to determining the level of confidence that the first job title corresponds to the user account satisfies the threshold level of confidence, processing logic can save in a data structure, an indication of an association between the job title obtained from the trained machine learning model (e.g., the predicted job title) and the user account. In some embodiments, processing logic can generate machine learning model refinement training data for training the trained machine learning model based on the indication of the association between the job title obtained from the trained machine learning model and the first user account.

At operation 405, processing logic provides information identifying the user account to a security threat detection system to determine whether the user account is engaged in malicious activity at the SaaS management platform. In some embodiments, processing logic can provide information identifying the second job title associated with the user account as an incorrect job title to an HR component of the client organization to determine whether the first job title should be associated with the user account in place of the second job title.

In some embodiments, the method 400 for using the trained machine learning model can be performed by a system including one or more components. The system can be configured to use the trained machine learning model to predict job titles based on information pertaining to accesses of data items at the SaaS management platform. The system can include a memory and a processing device operatively coupled to the memory, the processing device to perform the operations of method 400. The memory can store the operations of method 400 as one or more commands (e.g., processing logic) that, when performed by the processing device, cause the system to perform the operations of method 400 as described above. Additionally, in some embodiments, the operations of method 400 can be stored as one or more processing commands in a computer-readable storage medium, that when executed cause the method 400 to be performed.

FIG. 4B depicts a flow diagram of one example of a sub-method 450 that can be used as a portion of a method 400 for using a trained machine learning model to predict job titles based on information pertaining to accesses of data items at a SaaS management platform, in accordance with aspects of the disclosure. The sub-method 450 is performed by processing logic that can include hardware (circuitry, dedicated logic, etc.), software (e.g., instructions run on a processing device), or a combination thereof. In one embodiment, some or all the operations of sub-method 450 can be performed by one or more components of system 100 of FIGS. 1A-B, such as the job title sub-module 151A of the machine learning model module 151. It can be noted that components described with respect FIGS. 1A-B can be used to illustrate aspects of FIG. 4B. In some embodiments, the operations (e.g., operations 451-455) can be the same, different, fewer, or greater. For instance, in some embodiments one operation can be performed (e.g., operation 451) while another operation is not performed (e.g., operation 452). Sub-method 450 can be used as part of method 400 which uses the trained machine learning model (e.g., model 160A) to predict job titles based on access information.

At operation 451, processing logic provides to the trained machine learning model an input that includes access data identifying access types corresponding to data items accessed at the SaaS management platform using the user account. Access types are further described above with reference to access type 231B of FIG. 2.

At operation 452, processing logic provides to the trained machine learning model an input that includes access data identifying time periods corresponding to data items accessed at the SaaS management platform using the user account. Time periods corresponding to accessed data items are further described above with reference to access time period 231C of FIG. 2.

At operation 453, processing logic provides to the trained machine learning model an input that includes access data identifying frequencies at which data items were accessed at the SaaS management platform using the user account. Frequencies at which data items were accessed are further described above with reference to access frequency 231D of FIG. 2.

At operation 454, processing logic provides to the trained machine learning model an input that includes access data identifying device identifiers of user devices corresponding to the user account and used to access data items at the SaaS management platform. Device identifiers of user devices corresponding to the user account and used to access data items are further described above with reference to user device identifier 231E of FIG. 2.

At operation 455, processing logic provides to the trained machine learning model an input that includes information identifying search queries at the SaaS management platform corresponding to the user account. Information identifying search queries are further described above with reference to query data 230Y of FIG. 2.

As described above, some or all of sub-method 450 can be optionally performed as a part of method 400, specifically, in between operation 401 and operation 402, as illustratively shown in FIG. 4B as the operation "4B." Additionally, one or more of the operations of sub-method 450 can be performed. That is, each operation of sub-method 450 can be selectively performed, based on a configuration of the method 400. For example, method 400 that performs sub-method 450 may perform operation 453 and operation 455, skipping operations 451, 452, and 454. Thus, sub-method 450 can start before, and end after at any of the operations 451-455.

FIG. 4C depicts a flow diagram of one example of a sub-method 470 that can be used as a portion of a method 400 for using a trained machine learning model to predict job titles, using information pertaining to accesses of data items of a SaaS management platform, in accordance with aspects of the disclosure. The sub-method 470 is performed by processing logic that can include hardware (circuitry, dedicated logic, etc.), software (e.g., instructions run on a processing device), or a combination thereof. In one embodiment, some or all the operations of sub-method 450 can be performed by one or more components of system 100 of FIGS. 1A-B, such as the job title sub-module 151A of the machine learning model module 151. It can be noted that components described with respect FIGS. 1A-B can be used to illustrate aspects of FIG. 4C. In some embodiments, the operations (e.g., operations 471-473) can be the same, different, fewer, or greater. Sub-method 470 can be used as part of method 400 which uses the trained machine learning model (e.g., model 160A) to predict job titles based on access information.

At operation 471, after performing operation 401, or, alternatively, after performing the operations depicted in FIG. 4B, processing logic obtains, from the trained machine learning model, one or more outputs identifying (i) an indication of a first department associated with the client organization, and (ii) a level of confidence that the first department corresponds to the user account.

Alternatively, in parallel to, or serially with the operations 471-473, processing logic can perform the operations 402-404 depicted in FIG. 4A. Additional details regarding the operations 402-404 are described with reference to FIG. 4A.

At operation 472, processing logic determines whether the level of confidence that the first department corresponds to the user account satisfies a threshold level of confidence. If the level of confidence that the first department corresponds to the user account does not satisfy the threshold level of confidence, processing logic returns to operation 401 of FIG. 4A. If the level of confidence that the first department corresponds to the user account does satisfy the threshold level of confidence, processing logic proceeds to operation 473.

At operation 473, responsive to determining the level of confidence that the first department corresponds to the user account satisfies the threshold level of confidence, processing logic determines whether the first department is different from a second department associated with the user account. If the first department is not different from the second department associated with the user account, processing logic returns to operation 401 of FIG. 4A. If the first department is different from the second job title associated with the user account, processing logic can proceed to operation 405 of FIG. 4A.

Returning to operations 404 and 405 of FIG. 4A, in some embodiments where the operations of operation 4C have been performed and a department output is obtained from the machine learning model, operation 404 can be determined as "YES" even if the first job title is the same or similar to the second job title. For example, if the first job title is "Engineer," and corresponds to the "Software Department," and the second job title is "Engineer," and corresponds to the "Manufacturing Department," processing logic can determine that although the first job title and the second job title are the same or similar, "Manufacturing Department" does not correspond to "Software Department" and the corresponding job roles (and data accesses) should also be different. In another example, processing logic can determine that a predicted job title of "Engineer" does not correspond to a "Human Resources Department." Processing logic can identify job titles that do not correspond to respective departments and provide this information to a security threat detection system as described above with reference to operation 405 of FIG. 4A.

As described above, one or more operations of sub-method 470 can be optionally performed as a part of method 400, specifically, in between the operation "4B," and operation 405, as illustratively shown in FIG. 4A as the operation "4C."

Figure 5:
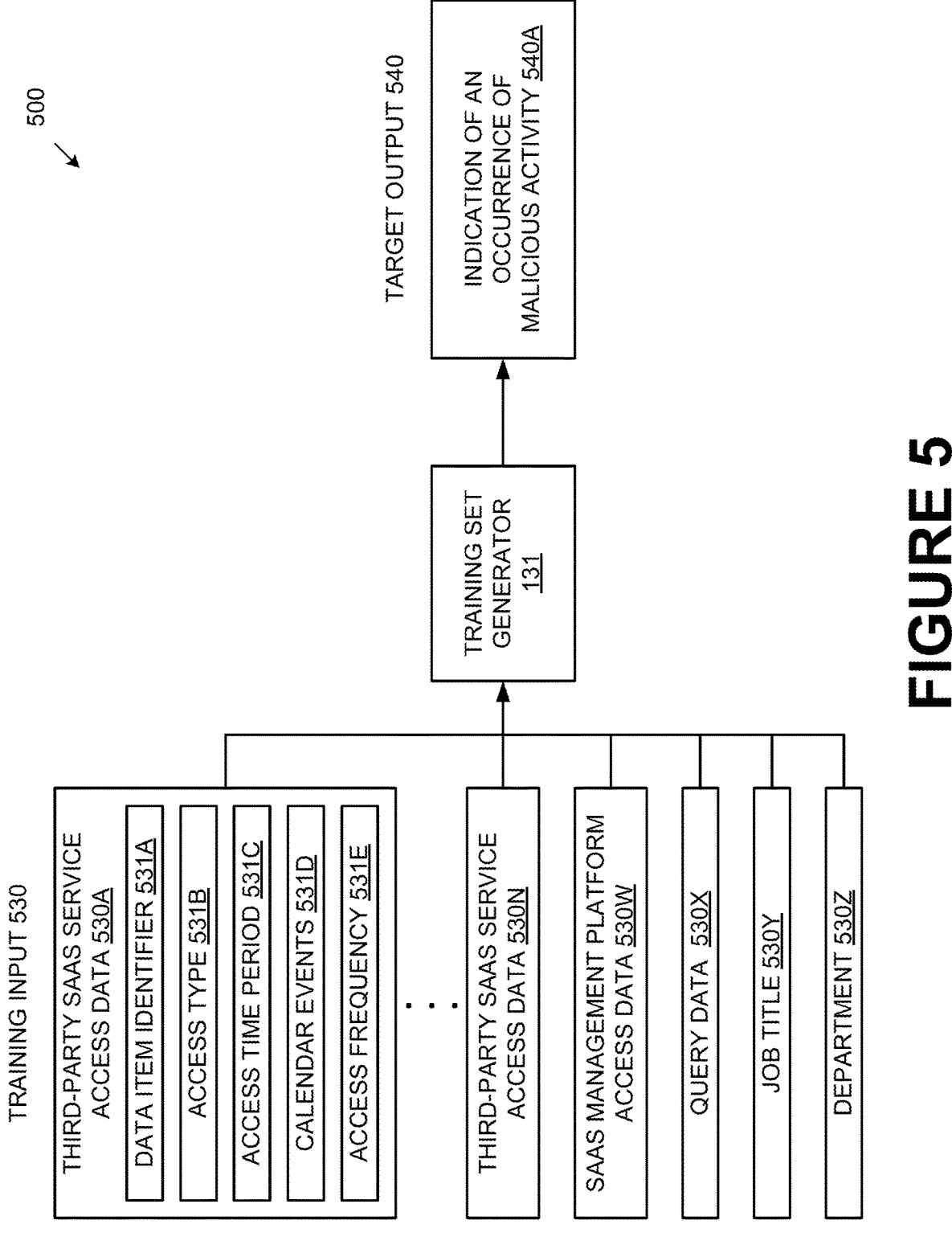
FIG. 5 is an example training set generator to create training data for a machine learning model using information pertaining to accesses of data items at a SaaS management platform, in accordance with aspects of the disclosure.

FIG. 5 is an example training set generator to create training data for a machine learning model using information pertaining to accesses of data items at a SaaS management platform, in accordance with aspects of the disclosure. System 500 shows training set generator 131, training inputs 530, and target outputs 540. System 500 can include similar components as system 100, as described with respect to FIG. 1A. Components described with respect to system 100 of FIG. 1A can be used to help describe system 500 of FIG. 5. In some embodiments, system 500 can illustrate training inputs 530 and target outputs 540 used to train the model 160B, to be used by the malicious activity sub-module I 151B.

In embodiments, training set generator 131 generates training data that includes one or more training inputs 530, and one or more target outputs 540. The training data can include mapping data that maps the training inputs 530 to the target outputs 540. Training inputs 530 can be referred to as "features," "attributes," or "information." In some embodiments, training set generator 131 can provide the training data in a training set, and provide the training set to the training engine 141 where the training set is used to train the model 160. Generating a training set is further described with reference to FIG. 6. In some embodiments, training inputs 530 can include third-party SaaS service access data 530A, third-party SaaS service access data 530N, SaaS management platform access data 530W, query data 530X, and job title 530Y and department 530Z associated with multiple user accounts (e.g., user accounts 113A-N). In some embodiments, training inputs 530 can be associated with a particular client organization, such as client organization 110A. For example, a first machine learning model can be trained using training set generator 131 using only the organizational data of client organization 110A. In some embodiments, each client organization 110A-N can use the respective organizational data to train respective machine learning models using training set generator 131. In some embodiments, a machine learning model can be trained using the organizational data of multiple client organizations 110A-N.

In some embodiments, third-party SaaS service access data 530A-530N or query data 530X can correspond to access information associated with services provided by a third-party SaaS service 122 (and associated with accesses by a particular client organization, such as client organization 110A). In some embodiments, SaaS management platform access data 530W or query data 530X can correspond to access information corresponding to services provided by SaaS management platform service 129 of SaaS management platform 120 (and to a particular client organization, such as client organization 110A). It can be noted that for the sake of brevity and clarity, the access information such as data item identifier 531A, access type 531B, access time period 531C, calendar events 531D, access frequency 531E is illustrated as pertaining to third-party SaaS service access data 530A (e.g., pertaining to a third-party SaaS service 122). In some embodiments, one or more of third-party SaaS service access data 530B-N or SaaS management platform access data 530W can also have similar access information.

The description of elements of FIG. 2 that are similar to elements of FIG. 5 are not repeated here for the sake of brevity and clarity. It can be appreciated that the description of elements in FIG. 2 can equally apply to similar elements of FIG. 5, unless otherwise described. Query data 530X can be the same or similar to query data 230Y of FIG. 2. Data item identifier 531A can be the same or similar to data item identifier 231A of FIG. 2. Access type 531B can be the same or similar to access type 231B of FIG. 2. Access time period 531C can be the same or similar access time period 531C of FIG. 2. Access frequency 531E can be the same or similar to access frequency 231D of FIG. 2.

In some embodiments, calendar events 531D can refer an event pertaining to a calendaring system, such as a digital calendaring system (e.g., a software calendar application). An event can include a scheduled event such as an entry, appointment, or vacation scheduled within a digital calendaring system. An event can include an unscheduled event such as a holiday, or non-workdays (e.g., weekends). In some embodiments, the calendar events 531 can be associated with other access information. For example, the accesses of data items (and the access information thereof) can be associated with particular calendar events. For instance, the access of a particular data item A can occur during work hours on Tuesday, October 5th or during a scheduled meeting on October 5th.

In some embodiments, calendar events 531D can be obtained from a digital calendaring system associated with a user account and provided by a third-party, or by the SaaS management platform 120 (such as via application 119). In some embodiments, a calendar event 531D can be obtained from other software applications of a user device 111 associated with a user account 113 (e.g., document creation software, email software, calendaring software, or operating system software). For example, event data of a calendaring software application associated with the user account 113 can indicate a user workday schedule, including out-of-office times (such as for vacation, or on weekends), and other events (e.g., meeting or calls). In some embodiments, a calendar event 531D can include time data pertaining to events, such as when the user is out-of-office (e.g., a calendared vacation).

Job titles 530Y can correspond to the job title of an organization-specific personnel position, as described above. In some embodiments, job titles 530Y can be obtained from a client organization, such as client organization 110A, as an assigned job title for a particular user associated with a user account. For example, an HR department of the client organization can assign a job title to a particular job role performed by an individual of the organization (e.g., a user associated with a user account). In some embodiments, job titles 530Y can be obtained from a trained machine learning model trained to predict a job title based on inputs such as access information.

Departments 530Z can correspond to a group within an organization that contributes to the organization's mission or goals, as described above (e.g., also referred to as a "department" herein). In some embodiments, a job title 530Y can be associated with a department 530Z. In some embodiments, departments 530Z can be obtained from a client organization, such as client organization 110A, as an assigned department for a particular user associated with a user account. For example, an HR department of the client organization can assign a particular job title (e.g., "engineer I") to an employee. The job title can correspond to a particular department (e.g., "product engineering") within the organizational structure of the organization. In some embodiments, departments 530Z can be obtained from a trained machine learning model trained to predict a department based on inputs such as access information. In some embodiments, departments 530Z can be derived or determined from a job title 530Y. For example, a job title can include the the the department 530Z in the job title 530Y, such as the job title "Marketing Director" in the department "Marketing," or the job title "Head of Engineering" in the department "Engineering."

In some embodiments, target output 540 can include an indication of an occurrence of malicious activity 540A. In some embodiments, some pairs of training inputs 530 and target outputs 540 can correspond to an occurrence of malicious activity, while other pairs of training inputs 530 and target outputs 540 do not correspond to an occurrence of malicious activity.

In some embodiments, subsequent to generating a training set and training the model 160 using the training set, the model 160 can be further trained (e.g., additional data for a training set) or adjusted (e.g., adjusting weights associated with input data of the model 160, such as connection weights in a neural network). In some embodiments, the model 160 can be trained on additional training inputs (not illustrated) and additional target outputs (not illustrated).

Figure 6:
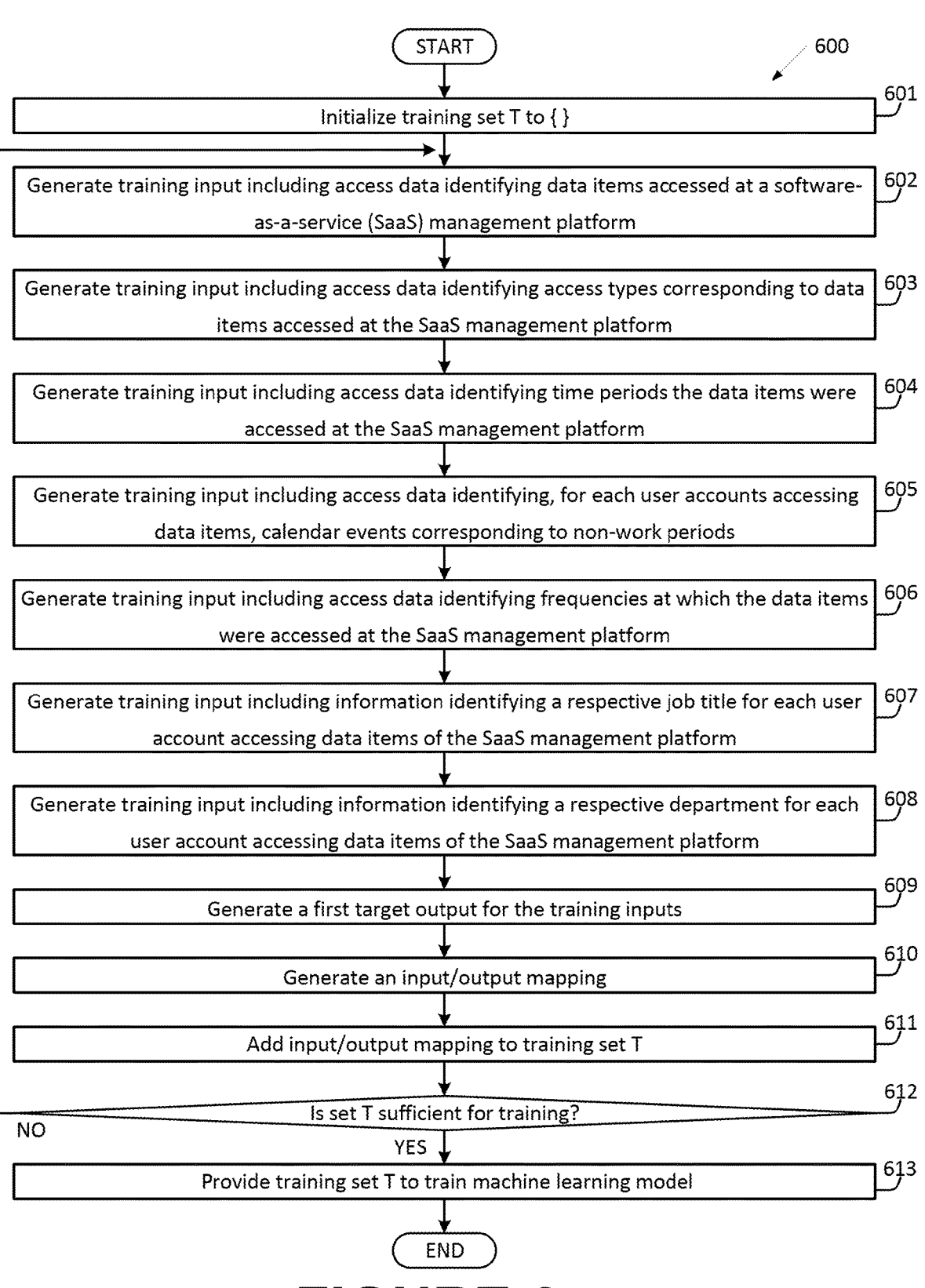
FIG. 6 depicts a flow diagram of one example method for training a machine learning model, in accordance with aspects of the disclosure.

FIG. 6 depicts a flow diagram of one example of a method 600 for training a machine learning model, in accordance with aspects of the disclosure. The method is performed by processing logic that can include hardware (circuitry, dedicated logic, etc.), software (e.g., instructions run on a processing device), or a combination thereof. In one embodiment, some or all the operations of method 600 can be performed by one or more components of system 100 of FIG. 1A. In other embodiments, one or more operations of method 600 can be performed by training set generator 131 of server machine 130 as described with respect to FIGS. 1A-Band 5. It can be noted that components described with respect FIGS. 1A-Band 5 can be used to illustrate aspects of FIG. 6. In some embodiments, the operations (e.g., operations 601-610) can be the same, different, fewer, or greater. For instance, in some embodiments one or more training inputs can be generated or one or more target outputs can be generated, and used one or more training inputs and one or more training outputs can be used as input-output pairs (for input) to train the machine learning model, such as model 160B to be used by the malicious activity sub-module I 151B.

Method 600 generates training data for a machine learning model. In some embodiments, at operation 601, processing logic implementing the method 600 initializes the training set "T" to an empty set (e.g., "{ }").

At operation 602, processing logic generates training input including access data identifying data items accessed at a software-as-a-service (SaaS) management platform such as SaaS management platform 120 as described with reference to FIG. 1A (e.g., as described with reference to SaaS management platform access data 530X of FIG. 5).

At operation 603, processing logic generates training input including access data identifying access types corresponding to the data items accessed at the SaaS management platform 120 (as described with reference to access type 531B of FIG. 5).

At operation 604, processing logic generates training input including access data identifying time periods the data items were accessed at the SaaS management platform 120 (as described with reference to access time period 531C of FIG. 5).

At operation 605, processing logic generates training input including access data identifying, for each user account accessing data items, calendar events corresponding to non-work periods (as described with reference to calendar events 531D of FIG. 5).

At operation 606, processing logic generates training input including access data identifying frequencies at which the data items were accessed at the SaaS management platform 120 (as described with reference to access frequency 531E of FIG. 5).

It can be noted that the access information used as training input to train the machine learning model (e.g., access data of operation 602 through operation 606, and query data) can pertain to any of the SaaS management platform services 129 and/or one or more third-party SaaS services 122A-N provided to a user through the SaaS management platform 120, in some embodiments. In some embodiments, operations 602-606 can include access information pertaining to a first SaaS service. In embodiments having multiple SaaS services, operations 602-606 can be repeated using access information pertaining to each respective SaaS service of the multiple SaaS services. In this way, access information for multiple SaaS services used by a single user account can be aggregated into a set of training inputs for training the machine learning model.

At operation 607, processing logic generates training input including information identifying a respective job title for each user account accessing data items of the SaaS management platform 120 (as described with reference to job title 530Y of FIG. 5).

At operation 608, processing logic generates training input including information identifying a respective department for each user account accessing data items of the SaaS management platform 120 (as described with reference to department 530Z of FIG. 5).

At operation 609, processing logic generates a first target output for one or more of the training inputs (e.g., training inputs described in operation 602 through operation 608). The first target output identifies for each of the subset of user accounts, an indication of an occurrence of malicious activity 540A based on training inputs 530. As described above, the indication of an occurrence of malicious activity 540A is based on accesses of data items at the SaaS management platform 120.

At operation 610, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s). At operation 611, processing logic adds the mapping data generated at operation 610 to training set T.

At operation 612, processing logic branches based on whether training set T is sufficient for training the model 160. If so, execution proceeds to operation 613, otherwise, execution continues back at operation 602. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 613, processing logic provides training set T to train the machine learning model (e.g., model 160). In one embodiment, training set T is provided to training engine 141 of server machine 140 to perform the training. In the case of a neural network, for example, input values of a given input/output mapping (e.g., numerical values associated with training inputs 530) are input to the neural network, and output values (e.g., numerical values associated with target outputs 540) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After operation 613, the machine learning model (e.g., model 160) can be trained using training engine 141 of server machine 140. The trained machine learning model (e.g., model 160) can be implemented by the malicious activity sub-module I 151B of the machine learning model module 151 (of server machine 150 or SaaS management platform 120) to determine an occurrence of malicious activity corresponding to accesses of data items at the SaaS management platform 120.

FIG. 7A depicts a flow diagram of one example of a method 700 for using a trained machine learning model to predict the occurrence of malicious activity, using information pertaining to accesses of data items of a SaaS management platform, in accordance with aspects of the disclosure. The method 700 is performed by processing logic that can include hardware (circuitry, dedicated logic, etc.), software (e.g., instructions run on a processing device), or a combination thereof. In one embodiment, some or all the operations of method 700 can be performed by one or more components of system 100 of FIGS. 1A-B, such as the malicious activity sub-module I 151B of the machine learning model module 151. It can be noted that components described with respect to FIGS. 1A-B can be used to illustrate aspects of FIG. 7A. In some embodiments, the operations (e.g., operations 701-704) can be the same, different, fewer, or greater. For instance, in some embodiments one or more inputs can be provided or one or more outputs can be obtained. Method 700 uses the trained machine learning model (e.g., model 160B) to predict an occurrence of malicious activity based on access information.

At operation 701, processing logic implementing the method 700 provides to the trained machine learning model an input that includes access data identifying data items accessed at the SaaS management platform using a user account associated with a client organization. After operation 701, processing logic can optionally perform one or more of the operations depicted in FIG. 7B, below. Additional details regarding the operations of 7B are described with reference to FIG. 7B.

It can be noted that the access information used as input for the machine learning model can be from one or more of the third-party SaaS services 122A-N and/or the SaaS management platform service(s) 129, in some embodiments. In some embodiments, the access information as described in operation 701 and the operations of FIG. 7B can be repeated for access information for one or more of the third-party SaaS services 122A-N and/or the SaaS management platform service(s) 129 as deemed relevant.

Figure 7B:
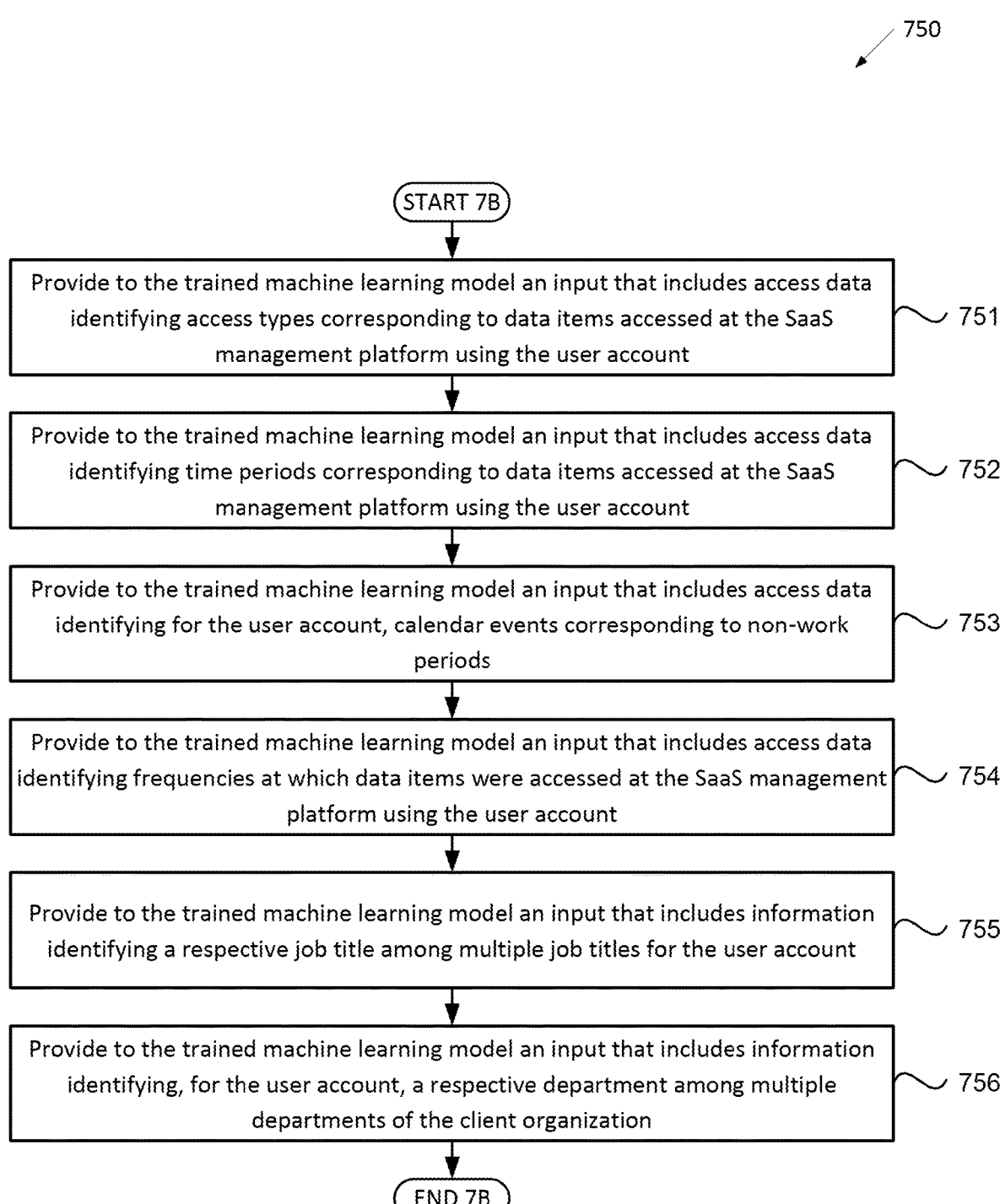
FIG. 7B depicts a flow diagram of one example sub-method that can be used as a portion of a method for using a trained machine learning model to predict the occurrence of malicious activity, using information pertaining to accesses of data items of a SaaS management platform, in accordance with aspects of the disclosure.

At operation 702, after performing operation 701, or, alternatively, after performing one or more of the operations depicted in FIG. 7B, processing logic obtains, from the trained machine learning model, one or more outputs identifying (i) an indication of a potential occurrence of malicious activity corresponding to the accesses of data items by the user account at the SaaS management platform and (ii) a level of confidence that the potential occurrence of malicious activity is an actual occurrence of malicious activity by the user account at the SaaS management platform.

At operation 703, processing logic determines whether the level of confidence that the potential occurrence of malicious activity is the actual occurrence of malicious activity satisfies a threshold level (e.g., threshold level of confidence). If the level of confidence that the potential occurrence of malicious activity is the actual occurrence of malicious activity does not satisfy the threshold level, processing logic returns to operation 701. If the level of confidence that the potential occurrence of malicious activity is the actual occurrence of malicious activity does satisfy the threshold level, processing logic proceeds to operation 704.

At operation 704, responsive to determining the level of confidence that the potential occurrence of malicious activity is the actual occurrence of malicious activity satisfies the threshold level, processing logic initiates a security response to address the actual occurrence of malicious activity.

In some embodiments, processing logic can select, among multiple security responses, a security response to address the actual occurrence of malicious activity. For example, and in some embodiments, to initiate a security response, processing logic can provide a notification identifying one or more of the actual occurrence of malicious activity, an identifier of the user account, and information identifying the access data. In some embodiments, the notification can be provided to the SaaS management platform 120. In some embodiments, the notification can be provided to the client organization 110, such as to an administrator user of client organization 110, such as an IT specialist. In some embodiments, the notification can be provided to a third-party, such as a third-party threat detection system. In some embodiments, the notification can be provided to one or more SaaS services (e.g., third-party SaaS service 122A-N) associated with the access information corresponding to the user account. In another example, and in some embodiments, to initiate a security response processing logic can initiate, at the SaaS management platform, an account lock out corresponding to the user account (e.g., preventing the user account from accessing the SaaS management platform).

In some embodiments, examples of security responses can also include, causing a partial account lockout corresponding to the user account (e.g., preventing access of one or more portions—but not all of—the SaaS management platform), requesting that the user account provide login credentials (e.g., username and password), or deprioritizing requests from the user account for data items or otherwise artificially increasing the time it takes for a user of a user account to access data items of the SaaS management platform. In some embodiments, client organizations can have organization-specific security responses. For example, a client organization can implement a multiple-incident policy that causes a security response to be initiated after an occurrence of malicious activity for a given user account has been predicted two or more times by the trained machine learning model (e.g., to reduce the potential for false positive predictions of an occurrence of malicious activity).

In some embodiments, the method 700 for using the trained machine learning model can be performed by a system including one or more components. The system can be configured to use the trained machine learning model to predict an occurrence of malicious activity based on accesses of data items as the SaaS management platform, and/or based on additional information such as query data, job title, department, etc. The system can include a memory and a processing device operatively coupled to the memory, the processing device to perform the operations of method 700. The memory can store the operations of method 700 as one or more commands (e.g., processing logic) that, when performed by the processing device, cause the system to perform the operations of method 700 as described above. Additionally, in some embodiments, the operations of method 700 can be stored as one or more processing commands in a computer-readable storage medium, that when executed cause the method 700 to be performed.

FIG. 7B depicts a flow diagram of one example of a sub-method 750 that can be used as a portion of a method 700 for using a trained machine learning model to predict the occurrence of malicious activity, using information pertaining to accesses of data items of a SaaS management platform by a user account and/or information pertaining to the user account, in accordance with aspects of the disclosure. The sub-method 750 is performed by processing logic that can include hardware (circuitry, dedicated logic, etc.), software (e.g., instructions run on a processing device), or a combination thereof. In one embodiment, some or all the operations of sub-method 750 can be performed by one or more components of system 100 of FIGS. 1A-B, such as malicious activity sub-module I 151B of machine learning model module 151. It can be noted that components described with respect FIGS. 1A-B can be used to illustrate aspects of FIG. 7B. In some embodiments, the operations (e.g., operations 751-756) can be the same, different, fewer, or greater. For instance, in some embodiments one operation can be performed (e.g., operation 751) while another operation is not performed (e.g., operation 752). Sub-method 750 can be used as part of method 700 which uses the trained machine learning model (e.g., model 160B) to predict an occurrence of malicious activity based on access information.

At operation 751, processing logic provides to the trained machine learning model an input that includes access data identifying access types corresponding to data items accessed at the SaaS management platform using the user account. Access types are further described above with reference to access type 531B of FIG. 5.

At operation 752, processing logic provides to the trained machine learning model an input that includes access data identifying time periods corresponding to data items accessed at the SaaS management platform using the user account. Time periods corresponding to accessed data items are further described above with reference to access time period 531C of FIG. 5.

At operation 753, processing logic provides to the trained machine learning model an input that includes access data identifying for the user account, calendar events corresponding to non-work periods. Calendar events are further described above with reference to calendar events 531D of FIG. 5.

At operation 754, processing logic provides to the trained machine learning model an input that includes access data identifying frequencies at which data items were accessed at the SaaS management platform using the user account. Frequencies at which data items were accessed are further described above with reference to access frequency 531E of FIG. 5.

At operation 755, processing logic provides to the trained machine learning model an input that includes information identifying a respective job title of among multiple of job titles for the user account. A respective job title for the user account is further described above with reference to job title 530Y of FIG. 5.

At operation 756, processing logic provides to the trained machine learning model an input that includes information identifying a respective department among multiple departments for the user account. A respective department for the user account is further described above with reference to department 530Z of FIG. 5.

As described above, sub-method 750 can be optionally performed as a part of method 700, specifically, in between operation 701 and operation 702, as illustratively shown in FIG. 7B as the operation "7B." Additionally, one or more of the operations of sub-method 750 can be performed. That is, each operation of sub-method 750 can be selectively performed, based on a configuration of the method 700. For example, method 700 that performs sub-method 750 may perform operation 753 and operation 756, skipping operations 751, 752, 754, and 755. Thus, sub-method 750 can start before, and end after at any of the operations 751-756.

Figure 8:
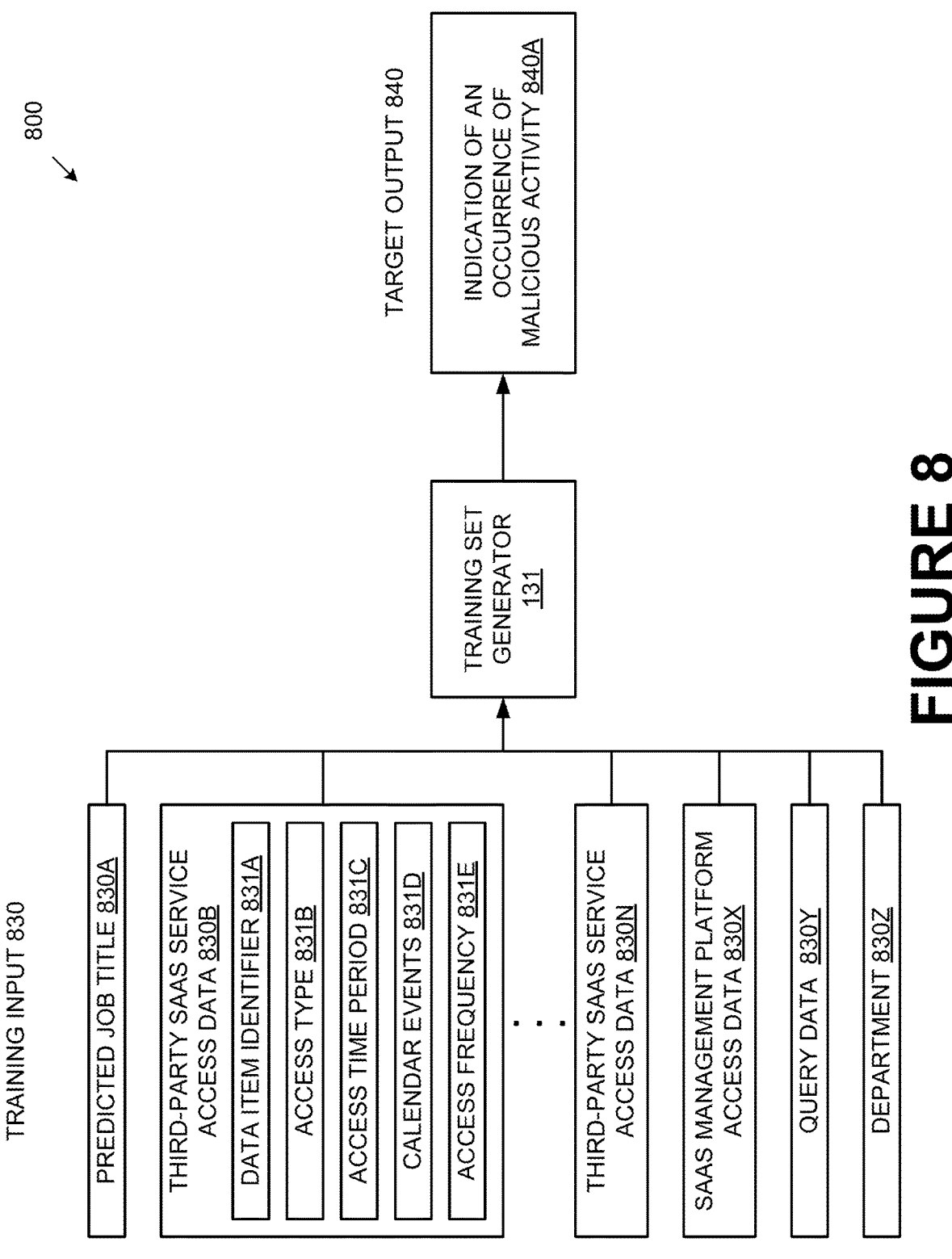
FIG. 8 is an example training set generator to create training data for a machine learning model using information pertaining to accesses of data items at a SaaS management platform, in accordance with aspects of the disclosure.

FIG. 8 is an example training set generator to create training data for a machine learning model using information pertaining to accesses of data items at a SaaS management platform, in accordance with aspects of the disclosure. System 800 shows training set generator 131, training inputs 830, and target outputs 840. System 800 can include similar components as system 100, as described with respect to FIG. 1A. Components described with respect to system 100 of FIG. 1A can be used to help describe system 800 of FIG. 8. In some embodiments, system 800 can illustrate training inputs 830 and target outputs 840 used to train the model 160C, to be used by the malicious activity sub-module II 151C.

In embodiments, training set generator 131 generates training data that includes one or more training inputs 830, and one or more target outputs 840. The training data can include mapping data that maps the training inputs 830 to the target outputs 840. Training inputs 830 can be referred to as "features," "attributes," or "information." In some embodiments, training set generator 131 can provide the training data in a training set, and provide the training set to the training engine 141 where the training set is used to train the model 160. Generating a training set is further described with reference to FIG. 6.

In some embodiments, training inputs 830 can include predicted job title 830A, third-party SaaS service access data 830B, third-party SaaS service access data 830N, SaaS management platform access data 830X, query data 830Y, and and department 830Z associated with multiple user accounts (e.g., user accounts 113A-N). In some embodiments, training inputs 830 can be associated with a particular client organization, such as client organization 110A. For example, a first machine learning model can be trained using training set generator 131 using only the organizational data of client organization 110A. In some embodiments, each client organization 110A-N can use the respective organizational data to train respective machine learning models using training set generator 131. In some embodiments, a machine learning model can be trained using the organizational data of multiple client organizations 110A-N.

In some embodiments, predicted job titles 830A can correspond to the job title of an organization-specific personnel position and have been predicted by a machine learning model, such as model 160 using job title submodule 151A of machine learning model module 151 as described above with reference to FIGS. 2-4C. In some embodiments, predicted job title 830A can correspond to the job title assigned to the employee by the organization and not predicted by the machine learning model.

In some embodiments, third-party SaaS service access data 830B-830N or query data 830Y can correspond to access information associated with respective services provided by a third-party SaaS service 122 (and associated with accesses by a particular client organization, such as client organization 110A). In some embodiments, SaaS management platform access data 830X or query data 830Y can correspond to access information corresponding to services provided by SaaS management platform service 129 of SaaS management platform 120 (and to a particular client organization, such as client organization 110A). It can be noted that for the sake of brevity and clarity, the access data such as data item identifier 831A, access type 831B, access time period 831C, calendar events 831D, access frequency 831E is illustrated as pertaining to third-party SaaS service access data 830A (e.g., pertaining to a third-party SaaS service 122). In some embodiments, one or more of third-party SaaS service access data 830C-N or SaaS management platform access data 830X can also have similar access data.

The description of elements of FIGS. 2 and 5 that are similar to elements of FIG. 8 are not repeated here for the sake of brevity and clarity. It can be appreciated that the description of elements in FIGS. 2 and 5 can equally apply to similar elements of FIG. 8, unless otherwise described. Query data 830X can be the same or similar to query data 230Y of FIG. 2. Department 830Z can be the same or similar to department 530Z of FIG. 5. Data item identifier 831A can be the same or similar to data item identifier 231A of FIG. 2. Access type 831B can be the same or similar to access type 231B of FIG. 2. Access time period 831C can be the same or similar access time period 231C of FIG. 2. Calendar events 831D can be the same or similar calendar events 531D of FIG. 5. Access frequency 831E can be the same or similar to access frequency 231D of FIG. 2.

In some embodiments, target output 840 can include an indication of an occurrence of malicious activity 840A. In some embodiments, some pairs of training inputs 830 and target outputs 840 can correspond to an occurrence of malicious activity, while other pairs of training inputs 830 and target outputs 840 do not correspond to an occurrence of malicious activity.

In some embodiments, subsequent to generating a training set and training the model 160 using the training set, the model 160 can be further trained (e.g., additional data for a training set) or adjusted (e.g., adjusting weights associated with input data of the model 160, such as connection weights in a neural network). In some embodiments, the model 160 can be trained on additional training inputs (not illustrated) and additional target outputs (not illustrated).

FIG. 9 depicts a flow diagram of one example of a method 900 for training a machine learning model, in accordance with aspects of the disclosure. The method is performed by processing logic that can include hardware (circuitry, dedicated logic, etc.), software (e.g., instructions run on a processing device), or a combination thereof. In one embodiment, some or all the operations of method 900 can be performed by one or more components of system 100 of FIG. 1A. In other embodiments, one or more operations of method 900 can be performed by training set generator 131 of server machine 130 as described with respect to FIGS. 1A-B and 8. It can be noted that components described with respect FIGS. 1A-B and 8 can be used to illustrate aspects of FIG. 9. In some embodiments, the operations (e.g., operations 901-904) can be the same, different, fewer, or greater. For instance, in some embodiments one or more training inputs can be generated or one or more target outputs can be generated, and used one or more training inputs and one or more training outputs can be used as input-output pairs (for input) to train the machine learning model, such as model 160C, to be used by the malicious activity sub-module II 151C.

Method 900 generates training data for a machine learning model. In some embodiments, at operation 901, processing logic implementing the method 900 initializes the training set "T" to an empty set (e.g., "{ }").

At operation 902, processing logic generates training input including information identifying a respective job title for each user of a subset of user accounts associated with a client organization.

At operation 903, processing logic generates training input including access information pertaining to accesses of data items at a software-as-a-service (SaaS) management platform such as SaaS management platform 120 as described with reference to FIG. 1A (e.g., as described with reference to SaaS management platform access data 830X of FIG. 8).

In some embodiments, the access information described with respect to operation 903 and can include one or more elements (and/or operations) of the access information as described herein, and in particular as described with respect to FIG. 8.

It can be noted that the information pertaining to accesses of data items used as training input to train the machine learning model can pertain to any of the SaaS management platform services 129 and/or one or more third-party SaaS services 122A-N provided to a user through the SaaS management platform 120, in some embodiments.

In some embodiments, operation 903 can include information pertaining to accesses of data items (e.g., access information) pertaining to a first SaaS service. In embodiments having multiple SaaS services, operation 903 can be repeated using access information pertaining to each respective SaaS service of the multiple SaaS services. In this way, access information for multiple SaaS services used by a single user account can be aggregated into a set of training inputs for training the machine learning model.

At operation 904, processing logic generates a first target output for one or more of the training inputs (e.g., training inputs described in operation 902 through operation 903). The first target output identifies for each of the subset of user accounts, an indication of an occurrence of malicious activity 840A based on training inputs 830. As described above, the indication of an occurrence of malicious activity 840A is based on accesses of data items at the SaaS management platform 120.

At operation 905, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s). At operation 6906, processing logic adds the mapping data generated at operation 905 to training set T.

At operation 907, processing logic branches based on whether training set T is sufficient for training the model 160. If so, execution proceeds to operation 908, otherwise, execution continues back at operation 602. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 908, processing logic provides training set T to train the machine learning model (e.g., model 160). In one embodiment, training set T is provided to training engine 141 of server machine 140 to perform the training. In the case of a neural network, for example, input values of a given input/output mapping (e.g., numerical values associated with training inputs 830) are input to the neural network, and output values (e.g., numerical values associated with target outputs 840) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After operation 908, the machine learning model (e.g., model 160) can be trained using training engine 141 of server machine 140. The trained machine learning model (e.g., model 160) can be implemented by the malicious activity sub-module II 151C of the machine learning model module 151 (of server machine 150 or SaaS management platform 120) to determine an occurrence of malicious activity corresponding to accesses of data items at the SaaS management platform 120.

Figure 10:
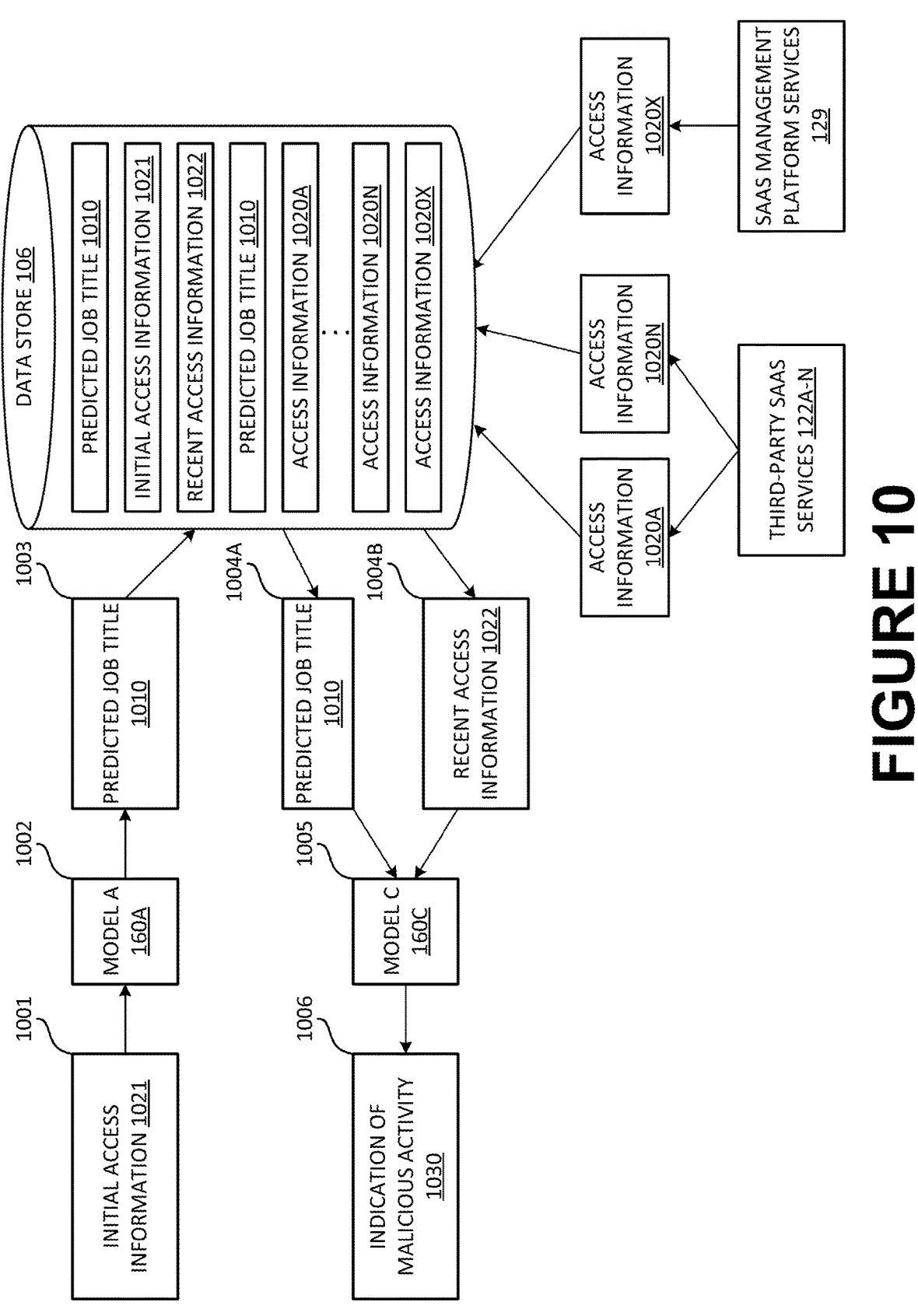
FIG. 10 is an example pipeline of operations for using multiple trained machine learning models to predict the occurrence of malicious activity using information pertaining to accesses of data items at a SaaS management platform, in accordance with aspects of the disclosure.

FIG. 10 is an example pipeline of operations for using multiple trained machine learning models to predict the occurrence of malicious activity using information pertaining to accesses of data items at a SaaS management platform, in accordance with aspects of the disclosure. In one embodiment, some or all the operations of pipeline 1000 can be performed by one or more components of system 100 of FIGS. 1A-B, such as the malicious activity sub-module II 151C, or the job title sub-module 151A of the machine learning model module 151. It can be noted that components described with respect to FIGS. 1A-B can be used to illustrate aspects of FIG. 10. Although the pipeline 1000 is illustrated with a particular order, it can be appreciated that some of the operations can performed serially or in parallel. In some embodiments, the operations (e.g., operations 1001-1007) can be the same, different, fewer, or greater. Pipeline 1000 illustrates using multiple trained machine learning models to predict an occurrence of malicious activity based on access information. A method for using multiple trained machine learning models to predict an occurrence of malicious activity based on access information is described below with reference to FIG. 11.

In some embodiments, at operation 1001, initial access information 1021 can be provided as input to a trained machine learning model A, such as model 160A. In some embodiments, initial access information 1021 can be obtained from a SaaS management platform such as SaaS management platform 120. In some embodiments, the SaaS management platform 120 and/or one or more third-party services 122A-N provide information that can be processed to obtain the initial access information (e.g., access information 1020A-N, or access information 1020X). In some embodiments, initial access information 1021 can be obtained from data store 106.

In some embodiments, at operation 1002, the trained machine learning model A, such as model 160A can process the input (e.g., initial access information 1021) to produce one or more outputs (e.g., predicted job title 1010). In some embodiments, operation 1002 can be performed by the job title sub-module 151A of the machine learning model module 151.

In some embodiments, at operation 1003, the output of the trained machine learning model (e.g., model A, such as model 160A) can be saved to a data store such as data store 106. In some embodiments, data store 106 can store the predicted job title 1010 for a respective user account (e.g., the user account associated with the initial access information 1021). In some embodiments, data store 106 can store access information 1020A-N and/or access information 1020X, obtained from third-party SaaS services 122A-N and/or SaaS management platform 120 respectively. In some embodiments, information indicating access information 1020A-N and/or access information 1020X can be obtained from third-party SaaS services 122A-N and/or SaaS management platform 120 respectively and can be preprocessed to obtain access information 1020A-N and/or access information 1020X respectively.

In some embodiments, operation 1004A and operation 1004B can represent portions of the operation 1004. In some embodiments, at operation 1004, predicted job title 1010 can be provided as input to a trained machine learning model C, such as model 160C (e.g., illustratively operation 1004A), and recent access information 1022 can be provided as second input to the trained machine learning model C (e.g., illustratively operation 1004B). Recent access information 1022 can be obtained from the data store 106. In some embodiments, recent access information 1022 can be obtained from SaaS management platform 120 and/or third-party SaaS services 122A-N respectively. In some embodiments, the predicted job title 1010 can be obtained directly as an output of model 160A.

In some embodiments, at operation 1005, the trained machine learning model C, such as model 160C, can process the inputs (e.g., the predicted job title 1010, and recent access information 1022) to produce one or more outputs (e.g., an indication of malicious activity 1030). In some embodiments, operation 1005 can be performed by the malicious activity sub-module II 151C of the machine learning model module 151. In some embodiments, the operations of 1002 and 1005 can be performed by the same machine learning model.

In some embodiments, at operation 1006, the output of the second trained machine learning model (e.g., model C, such as model 160C) can be an indication of malicious activity 1030. In some embodiments at operation 1006, additional logic can be performed based on the indication of malicious activity 1030, such as is further described above with reference to operation 704 of FIG. 7A.

Figure 11:
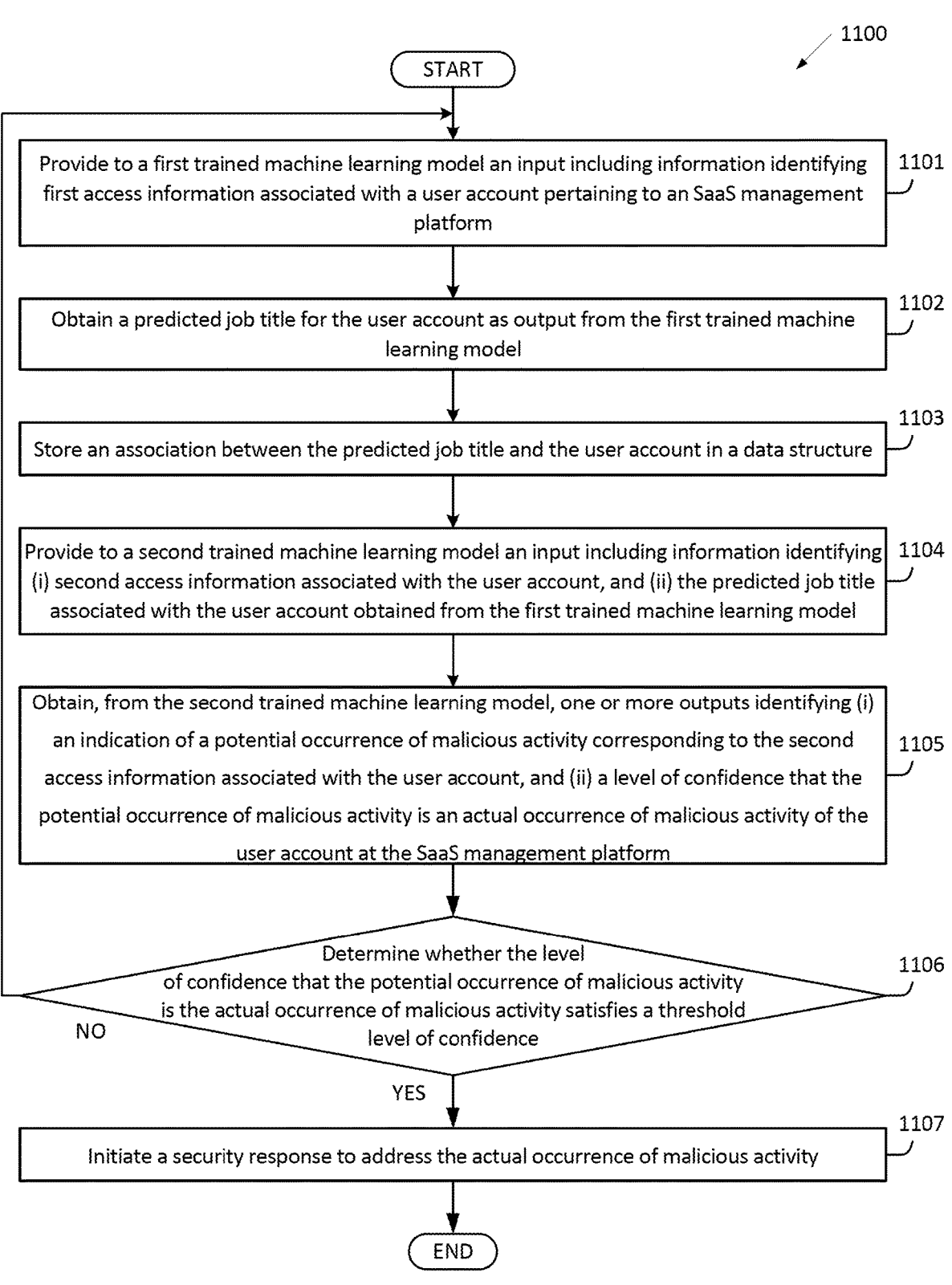
FIG. 11 depicts a flow diagram of one example method for using multiple trained machine learning models to predict the occurrence of malicious activity, using information pertaining to accesses of data items at a SaaS management platform, in accordance with aspects of the disclosure.

FIG. 11 depicts a flow diagram of one example of a method 1100 for using multiple trained machine learning models to predict the occurrence of malicious activity, using information pertaining to accesses of data items at a SaaS management platform, in accordance with aspects of the disclosure. The method 1100 is performed by processing logic that can include hardware (circuitry, dedicated logic, etc.), software (e.g., instructions run on a processing device), or a combination thereof. In one embodiment, some or all the operations of method 1100 can be performed by one or more components of system 100 of FIGS. 1A-B, such as the malicious activity sub-module II 151C, or the job title sub-module 151A of the machine learning model module 151. It can be noted that components described with respect to FIGS. 1A-B can be used to illustrate aspects of FIG. 11. In some embodiments, the operations (e.g., operations 1101-1107) can be the same, different, fewer, or greater. Method 1100 uses trained machine learning models to predict an occurrence of malicious activity based on access information.

At operation 1101, processing logic implementing the method 1100 provides to a first trained machine learning model an input that includes information identifying first access information associated with a user account pertaining to a SaaS management platform. It can be noted that the access information used as input for the machine learning model can be from one or more of the third-party SaaS services 122A-N and/or the SaaS management platform service(s) 129, in some embodiments. In some embodiments, the access information as described in operation 1001 can be repeated for access information for one or more of the third-party SaaS services 122A-N and/or the SaaS management platform service(s) 129 as deemed relevant.

At operation 1102, processing logic obtains a predicted job title for the user account as output from the first machine learning model. In some embodiments, operations 1101 and 1102 can be repeated periodically to update the predicted job title for the user account (e.g., annually, semi-annually, etc.). In some embodiments, the period can be specific to a client organization, such as client organization 110A.

At operation 1103, processing logic stores an association between the predicted job title and the user account in a data structure, such as table of a data store (e.g., data store 106 of FIG. 1).

At operation 1104, processing logic provides to a second trained machine learning model an input including information identifying (i) second access information associated with the user account, and (ii) the predicted job title associated with the user account obtained from the first trained machine learning model.

At operation 1105, processing logic obtains from the second trained machine learning model, one or more outputs identifying (i) an indication of a potential occurrence of malicious activity corresponding to the second access information associated with the user account, and (ii) a level of confidence that the potential occurrence of malicious activity is an actual occurrence of malicious activity of the user account at the SaaS management platform.

In some embodiments, operations 1104 and 1105 can be performed at a regular update interval (e.g., daily, weekly, monthly, etc.). For example, and in some embodiments, access information for each day can be used for operation 1104. In some embodiments, a sliding window approach can be implemented with respect to access information. For example, access information can be provided to operation 1104 each day. The access information can include access information for the current day and for N number of preceding days.

At operation 1106, processing logic determines whether the level of confidence that the potential occurrence of malicious activity is the actual occurrence of malicious activity satisfies a threshold level of confidence. If the level of confidence that the potential occurrence of malicious activity is the actual occurrence of malicious activity does not satisfy the threshold level of confidence, processing logic returns to operation 1101. If the level of confidence that the potential occurrence of malicious activity is the actual occurrence of malicious activity does satisfy the threshold level, processing logic proceeds to operation 1107.

At operation 1107, responsive to determining the potential occurrence of malicious activity is an actual occurrence of malicious activity, processing logic initiates a security response to address the actual occurrence of malicious activity. It can be noted that for the sake of brevity and clarity, operation 1105 can be the same or similar to operation 704 of FIG. 7A.

It can be noted that operations of other methods described herein, can equally be applied to method 1100.

Figure 12:
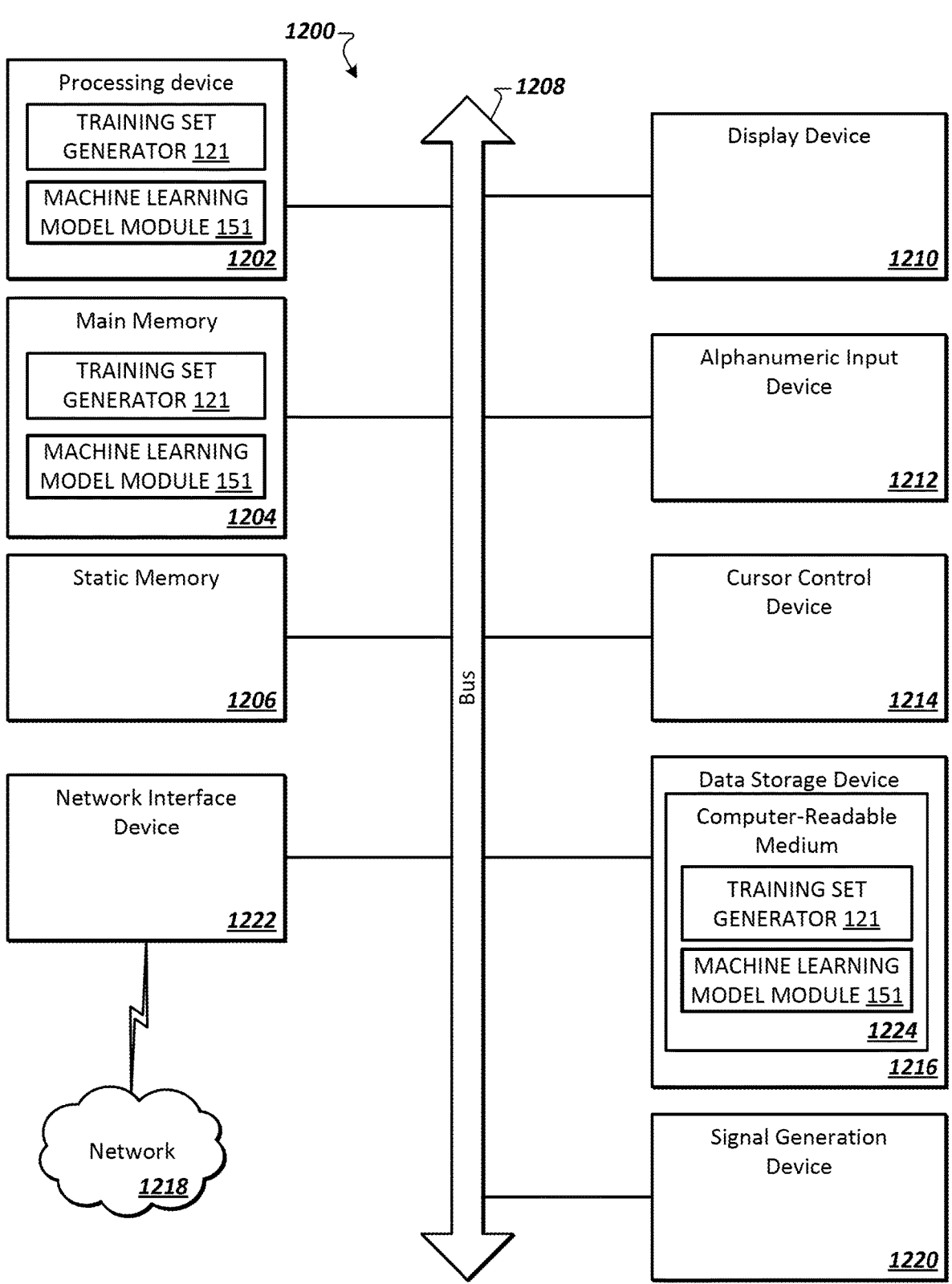
FIG. 12 is a block diagram illustrating an exemplary computer system, in accordance with aspects of the disclosure.

FIG. 12 is a block diagram illustrating an exemplary computer system, system 1200, in accordance with aspects of the disclosure. The system 1200 executes one or more sets of instructions that cause the machine to perform any one or more of the methodologies discussed herein. Set of instructions, instructions, and the like can refer to instructions that, when executed system 1200, cause the system 1200 to perform one or more operations of training set generator 131 or machine learning model module 151. The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1216, which communicate with each other via a bus 1208.

The processing device 1202 represents one or more general-purpose processing devices such as a microprocessor, central processing unit, or the like. More particularly, the processing device 1202 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions of the system 100 and the training set generator 131 or machine learning model module 151 for performing the operations discussed herein.

The system 1200 can further include a network interface device 1222 that provides communication with other machines over a network 1218, such as a local area network (LAN), an intranet, an extranet, or the Internet. The system 1200 also can include a display device 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 can include a computer-readable storage medium 1224 on which is stored the sets of instructions of the system 100 and of training set generator 131 or of machine learning model module 151 embodying any one or more of the methodologies or functions described herein. The computer-readable storage medium 1224 can be a non-transitory computer-readable storage medium. The sets of instructions of the system 100 and of training set generator 131 or of machine learning model module 151 can also reside, completely or at least partially, within the main memory 1204 and/or within the processing device 1202 during execution thereof by the system 1200, the main memory 1204 and the processing device 1202 also constituting computer-readable storage media. The sets of instructions can further be transmitted or received over the network 1218 via the network interface device 1222.

While the example of the computer-readable storage medium 1224 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding, or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "obtaining", "identifying", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and can not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method for training a machine learning model using information pertaining to accesses of data items at a software-as-a-service (SaaS) management platform, the method comprising:
   generating training data for the machine learning model, wherein generating the training data comprises:
   generating a first training input, the first training input comprising first access data identifying a first plurality of data items accessed at the SaaS management platform using a first subset of a plurality of user accounts associated with a client organization;
   generating a first target output for the first training input, wherein the first target output identifies, for each of the first subset of user accounts, information identifying at least one job title of a plurality of job titles associated with the client organization based on the first access data; and
   providing the training data to train the machine learning model on (i) a set of training inputs comprising the first training input, and (ii) a set of target outputs comprising the first target output.

2. The method of claim 1, wherein the first training input comprises the first access data identifying the first plurality of data items accessed at a first SaaS service of the SaaS management platform, wherein generating the training data for the machine learning model, further comprises:
   generating a second training input, the second training input comprising second access data identifying a second plurality of data items accessed at a second SaaS service of the SaaS management platform using a second subset of the plurality of user accounts, and
   wherein the first target output identifies, for each of the second subset of user accounts, information identifying the respective job title of the plurality of job titles associated with the client organization, and
   wherein the set of training inputs comprises the second training input.

3. The method of claim 1, wherein generating the training data for the machine learning model, further comprises:
   generating a third training input, the third training input comprising third access data identifying access types corresponding to the first plurality of data items accessed at the SaaS management platform using the first subset of user accounts,
   wherein the set of training inputs comprises the third training input.

4. The method of claim 1, wherein generating the training data for the machine learning model, further comprises:
   generating a fourth training input, the fourth training input comprising fourth access data identifying time periods the first plurality of data items were accessed at the SaaS management platform using the first subset of user accounts, wherein the set of training inputs comprises the fourth training input.

5. The method of claim 1, wherein generating the training data for the machine learning model, further comprises:

generating a fifth training input, the fifth training input comprising fifth access data identifying frequencies at which the first plurality of data items were accessed at the SaaS management platform using the first subset of user accounts, wherein the set of training inputs comprises the fifth training input.

6. The method of claim 1, wherein generating the training data for the machine learning model, further comprises:

generating a sixth training input, the sixth training input comprising sixth access data identifying device identifiers of a plurality of user devices corresponding with the first subset of user accounts and used to access the first plurality of data items at the SaaS management platform, wherein the set of training inputs comprises the sixth training input.

7. The method of claim 1, wherein generating the training data for the machine learning model, further comprises:

generating a seventh training input, the seventh training input comprising query data identifying search queries at the SaaS management platform and corresponding with the first subset of user accounts, wherein the set of training inputs comprises the seventh training input.

8. The method of claim 1, wherein generating the training data for the machine learning model, further comprises:

generating a second target output for the first training input, wherein the second target output identifies, for each of the first subset of user accounts, information identifying a respective department of a plurality of departments associated with the client organization, wherein the set of training outputs comprises the second training output.

9. The method of claim 1, wherein each training input of the set of training inputs is mapped to the first target output in the set of target outputs.

10. A method for using a trained machine learning model using information pertaining to accesses of data items at a software-as-a-Service (SaaS) management platform to determine a job title of a plurality of job titles associated with a client organization, the method comprising:

providing to the trained machine learning model a first input, the first input comprising first access data identifying a first plurality of data items accessed at the SaaS management platform using a first user account of a plurality of user accounts associated with the client organization; and generating, using the trained machine learning model, one or more outputs identifying (i) an indication of the job title of the plurality of job titles associated with the client organization for the first user account, and (ii) a level of confidence that the indication of the job title for the first user account corresponds to the accesses of the data items at the SaaS management platform.

11. The method of claim 10, wherein the job title is a first job title, the method further comprising:

determining whether the first job title obtained from the trained machine learning model is different than a second job title associated with the first user account; and responsive to determining that the first job title is different than the second job title, providing information identifying the first user account to a security threat detection system to determine whether the first user account is engaged in malicious activity at the SaaS management platform.

12. The method of claim 11, further comprising:

determining whether the level of confidence that the job title corresponds to the information pertaining to the accesses of the data items at the SaaS management platform satisfies a threshold level of confidence, wherein providing the information identifying the first user account to the security threat detection system is responsive to determining that the level of confidence satisfies the threshold level of confidence.

13. The method of claim 10, further comprising:

providing to the trained machine learning model a second input comprising second access data identifying a second plurality of data items accessed at a second SaaS service of the SaaS management platform using the first user account.

14. The method of claim 10, further comprising:

providing to the trained machine learning model a third input comprising third access data identifying access types corresponding to the first plurality of data items accessed at the SaaS management platform using the first user account.

15. The method of claim 10, further comprising:

providing to the trained machine learning model a fourth input comprising fourth access data identifying time periods the first plurality of data items were accessed at the SaaS management platform using the first user account.

16. The method of claim 10, further comprising:

providing to the trained machine learning model a fifth input comprising fifth access data identifying frequencies at which the first plurality of data items were accessed at the SaaS management platform using the first user account.

17. The method of claim 10, further comprising:

providing to the trained machine learning model a sixth input comprising sixth access data identifying device identifiers of a user device corresponding with the first user account and used to access the first plurality of data items at the SaaS management platform.

18. The method of claim 10, further comprising:

providing to the trained machine learning model a seventh input comprising query data identifying search queries at the SaaS management platform and corresponding with the first user account.

19. A system for training a machine learning model using information pertaining to accesses of data items at a software-as-a-service (SaaS) management platform, the system comprising:

a memory; and a processing device operatively coupled to the memory, the processing device to perform operations comprising:

generating training data for the machine learning model, wherein generating the training data comprises:

generating a first training input, the first training input comprising first access data identifying a first plurality of data items accessed at the SaaS management platform using a first subset of a plurality of user accounts associated with a client organization;

generating a first target output for the first training input, wherein the first target output identifies, for each of the first subset of user accounts, information identifying at least one job title of a plurality of job titles associated with the client organization based on the first access data; and providing the training data to train the machine learning model on (i) a set of training inputs comprising the first training input, and (ii) a set of target outputs comprising the first target output.

20. The system of claim 19, wherein the first training input comprises the first access data identifying the first plurality of data items accessed at a first SaaS service of the SaaS management platform, wherein generating the training data for the machine learning model, further comprises:

generating a second training input, the second training input comprising second access data identifying a second plurality of data items accessed at a second SaaS service of the SaaS management platform using a second subset of the plurality of user accounts, and wherein the first target output identifies, for each of the second subset of user accounts, information identifying the respective at least one job title of the plurality of job titles associated with the client organization, and wherein the set of training inputs comprises the second training input.

21. The system of claim 19, wherein generating the training data for the machine learning model, further comprises:

generating a third training input, the third training input comprising third access data identifying access types corresponding to the first plurality of data items accessed at the SaaS management platform using the first subset of user accounts, wherein the set of training inputs comprises the third training input.

22. The system of claim 19, wherein generating the training data for the machine learning model, further comprises:

generating a seventh training input, the seventh training input comprising query data identifying search queries at the SaaS management platform and corresponding with the first subset of user accounts,

54 wherein the set of training inputs comprises the seventh training input.

23. A system for using a trained machine learning model using information pertaining to accesses of data items at a software-as-a-service (SaaS) management platform to determine a job title of a plurality of job titles associated with a client organization, the system comprising:

a memory; and a processing device operatively coupled to the memory, the processing device to perform operations comprising:

providing to the trained machine learning model a first input, the first input comprising first access data identifying a first plurality of data items accessed at the SaaS management platform using a first user account of a plurality of user accounts associated with the client organization; and generating, using the trained machine learning model, one or more outputs identifying (i) an indication of the job title of the plurality of job titles associated with the client organization, and (ii) a level of confidence that the job title corresponds to the accesses of the data items at the SaaS management platform.

24. The system of claim 23, the operations further comprising:

determining whether a first job title obtained from the trained machine learning model is different than a second job title associated with the first user account; and responsive to determining that the first job title is different than the second job title, providing information identifying the first user account to a security threat detection system to determine whether the first user account is engaged in malicious activity at the SaaS management platform.

25. The system of claim 23, the operations further comprising:

providing to the trained machine learning model a second input comprising second access data identifying a second plurality of data items accessed at a second SaaS service of the SaaS management platform using the first user account.

* * * * *